US012180437B2

(12) United States Patent
Randall et al.

(10) Patent No.: US 12,180,437 B2
(45) Date of Patent: Dec. 31, 2024

(54) TREATMENT COMPOSITIONS COMPRISING A SURFACTANT SYSTEM AND AN OLIGOAMINE

(71) Applicant: The Procter & Gamble Company, Cincinnati, OH (US)

(72) Inventors: Sherri Lynn Randall, Hamilton, OH (US); Fabrizio Meli, Montgomery, OH (US); Gregory Scot Miracle, Liberty Township, OH (US); Patrick Christopher Stenger, Fairfield, OH (US); Giulia Ottavia Bianchetti, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/592,702

(22) Filed: Feb. 4, 2022

(65) Prior Publication Data

US 2022/0154107 A1 May 19, 2022

Related U.S. Application Data

(63) Continuation of application No. 16/547,625, filed on Aug. 22, 2019, now Pat. No. 11,274,266.

(30) Foreign Application Priority Data

Aug. 24, 2018 (EP) .................................... 18190607

(51) Int. Cl.

| | |
|---|---|
| ***C11D 1/22*** | (2006.01) |
| ***C11D 1/12*** | (2006.01) |
| ***C11D 1/14*** | (2006.01) |
| ***C11D 1/30*** | (2006.01) |
| ***C11D 1/72*** | (2006.01) |
| ***C11D 1/722*** | (2006.01) |
| ***C11D 1/83*** | (2006.01) |
| ***C11D 3/00*** | (2006.01) |
| ***C11D 3/30*** | (2006.01) |
| ***C11D 3/33*** | (2006.01) |
| ***C11D 3/386*** | (2006.01) |
| *C11D 1/29* | (2006.01) |
| *C11D 1/75* | (2006.01) |

(52) U.S. Cl.

CPC .................. *C11D 3/30* (2013.01); *C11D 1/12* (2013.01); *C11D 1/14* (2013.01); *C11D 1/22* (2013.01); *C11D 1/722* (2013.01); *C11D 1/83* (2013.01); *C11D 3/0084* (2013.01); *C11D 3/33* (2013.01); *C11D 3/38618* (2013.01); *C11D 1/29* (2013.01); *C11D 1/72* (2013.01); *C11D 1/75* (2013.01); *C11D 2111/12* (2024.01)

(58) Field of Classification Search

CPC .... C11D 1/14; C11D 3/30; C11D 3/33; C11D 3/86; C11D 3/38618; C11D 1/722; C11D 1/29; C11D 1/75

USPC ....... 510/280, 300, 302, 321, 499, 503, 251, 510/352, 360

See application file for complete search history.

(56) References Cited

U.S. PATENT DOCUMENTS

| | | | |
|---|---|---|---|
| 2,509,197 | A | 5/1950 | Ben |
| 3,003,970 | A | 10/1961 | Call |
| 3,776,850 | A | 12/1973 | Pearson et al. |
| 3,940,482 | A | 2/1976 | Grand |
| 4,089,945 | A | 5/1978 | Brinkman et al. |
| 4,185,106 | A | 1/1980 | Dittmar et al. |
| 4,192,692 | A | 3/1980 | Herrmann |
| 4,321,156 | A | 3/1982 | Bushman |
| 4,412,943 | A | 11/1983 | Hirota et al. |
| 4,556,509 | A | 12/1985 | Demangeon |
| 4,749,507 | A | 6/1988 | Varco |
| 4,822,604 | A | 4/1989 | Knoll et al. |
| 4,855,130 | A | 8/1989 | Konrad et al. |
| 5,306,489 | A | 4/1994 | Goldberg et al. |
| 5,559,092 | A | 9/1996 | Gibson et al. |
| 5,635,167 | A | 6/1997 | Said et al. |
| 5,728,668 | A | 3/1998 | Thomas |
| 5,804,172 | A | 9/1998 | Ault |
| 5,827,813 | A | 10/1998 | Hartman et al. |
| 5,847,003 | A | 12/1998 | Ptchelintsev et al. |
| 5,851,981 | A | 12/1998 | Choy |
| 5,990,065 | A | 11/1999 | Vinson |
| 6,069,122 | A | 5/2000 | Vinson |
| 6,069,169 | A | 5/2000 | Ptchelintsev et al. |
| 6,071,962 | A | 6/2000 | Ptchelintsev et al. |
| 6,281,181 | B1 | 8/2001 | Vinson et al. |
| 6,287,547 | B1 | 9/2001 | Oota et al. |
| 6,348,189 | B1 | 2/2002 | Tanabe et al. |

(Continued)

FOREIGN PATENT DOCUMENTS

| | | | |
|---|---|---|---|
| CA | 1147262 | A | 5/1983 |
| CN | 1197479 | A | 10/1998 |

(Continued)

OTHER PUBLICATIONS

All Office Actions; U.S. Appl. No. 17/682,122, filed Feb. 28, 2022.
Unpublished U.S. Appl. No. 17/682,122, filed Feb. 28, 2022, to Sherri Lynn Randall et al.
15335 PCT Search Report and Written Opinion for PCT/US2019/046481 dated Nov. 4, 2019.
All Office Actions; U.S. Appl. No. 16/543,660, filed Aug. 19, 2019.
All Office Actions; U.S. Appl. No. 16/543,670, filed Aug. 19, 2019.
All Office Actions; U.S. Appl. No. 16/547,621, filed Aug. 22, 2019.
All Office Actions; U.S. Appl. No. 16/547,625, filed Aug. 22, 2019.
DOW Publication, "Ethyleneamines", retrieved from www.dow.com, 46 pages.
Extended European Search Report and Search Opinion; Application Ser. No. 18190607.4; dated Mar. 19, 2019; 10 pages.

(Continued)

*Primary Examiner* — Gregory R Delcotto
(74) *Attorney, Agent, or Firm* — Andrew J. Mueller; George H. Leal

(57) ABSTRACT

Treatment compositions that include a surfactant system and an oligoamine, the surfactant system including linear alkyl benzene sulfonate. Related methods of use and preparation of such compositions.

9 Claims, No Drawings

(56) References Cited

U.S. PATENT DOCUMENTS

| | | | |
|---|---|---|---|
| 6,358,502 | B1 | 3/2002 | Tanabe et al. |
| 6,362,147 | B1 | 3/2002 | Castro |
| 6,365,143 | B1 | 4/2002 | Lundmark et al. |
| 6,369,024 | B1 | 4/2002 | Panandiker |
| 6,380,263 | B1 | 4/2002 | Pruche et al. |
| 6,432,147 | B1 | 8/2002 | Dias et al. |
| 6,432,394 | B2 | 8/2002 | Pyles et al. |
| 6,509,011 | B1 | 1/2003 | Ellis et al. |
| 6,525,013 | B1 | 2/2003 | Littig et al. |
| 6,544,500 | B1 | 4/2003 | O'Toole et al. |
| 6,551,361 | B1 | 4/2003 | Cornwell et al. |
| 6,602,493 | B2 | 8/2003 | Akhter et al. |
| 6,624,126 | B1 | 9/2003 | Kasuga et al. |
| 6,680,289 | B1 | 1/2004 | Woo |
| 6,710,023 | B1 | 3/2004 | Bodet |
| 6,743,434 | B1 | 6/2004 | Lundmark et al. |
| 6,750,189 | B1 | 6/2004 | Zhang |
| 6,774,099 | B1 | 8/2004 | Scheibel et al. |
| 6,858,202 | B2 | 2/2005 | Niemiec et al. |
| 6,864,314 | B1 | 3/2005 | Yeung et al. |
| 6,927,196 | B2 | 8/2005 | Snyder et al. |
| 6,951,710 | B2 | 10/2005 | Rieker |
| 7,018,968 | B2 | 3/2006 | Hsu |
| 7,045,493 | B2 | 5/2006 | Wang et al. |
| 7,083,801 | B2 | 8/2006 | El A mma |
| 7,169,743 | B2 | 1/2007 | Wang et al. |
| 7,186,274 | B2 | 3/2007 | Vic et al. |
| 7,186,275 | B2 | 3/2007 | Boswell |
| 7,232,777 | B1 | 6/2007 | Van Hyning |
| 7,300,647 | B1 | 11/2007 | O'Toole et al. |
| 7,335,700 | B2 | 2/2008 | Yeung et al. |
| 7,387,992 | B2 | 6/2008 | Hsu |
| 7,517,847 | B2 | 4/2009 | Catalfamo |
| 7,547,454 | B2 | 6/2009 | Gupta |
| 7,700,078 | B2 | 4/2010 | Huglin et al. |
| 7,709,430 | B2 | 5/2010 | Mizushima |
| 7,745,382 | B2 | 6/2010 | Sloan |
| 7,915,212 | B2 | 3/2011 | Yeung et al. |
| 8,022,020 | B2 | 9/2011 | Sloan |
| 8,039,424 | B2 | 10/2011 | Sloan |
| 8,193,144 | B2 | 6/2012 | Tanner |
| 8,404,257 | B1 | 3/2013 | Huglin et al. |
| 8,449,868 | B2 | 5/2013 | Jennings et al. |
| 8,637,489 | B2 | 1/2014 | Van Nguyen et al. |
| 8,942,481 | B2 | 1/2015 | Suarez et al. |
| 9,044,413 | B2 | 6/2015 | Yeung et al. |
| 9,080,135 | B2 | 7/2015 | Hough et al. |
| 9,271,908 | B2 | 3/2016 | Allef et al. |
| 9,358,195 | B2 | 6/2016 | Lupia et al. |
| 9,586,063 | B2 | 3/2017 | Marsh et al. |
| 9,642,788 | B2 | 5/2017 | Marsh et al. |
| 9,677,032 | B2 | 6/2017 | Hulskotter |
| 9,752,101 | B2 | 9/2017 | Loughnane |
| 9,821,081 | B2 | 11/2017 | Williams |
| 9,868,925 | B2 | 1/2018 | Hulskotter |
| 10,539,872 | B2 | 1/2020 | Tadokoro |
| 10,973,744 | B2 | 4/2021 | Marsh et al. |
| 11,166,894 | B2 | 11/2021 | Marsh et al. |
| 11,274,266 | B2 * | 3/2022 | Randall ................ C11D 3/0084 |
| 11,279,901 | B2 * | 3/2022 | Randall ................ C07C 211/14 |
| 2003/0095938 | A1 | 5/2003 | Casero |
| 2003/0125224 | A1 | 7/2003 | Seitz, Jr. et al. |
| 2003/0176303 | A1 | 9/2003 | Niemiec et al. |
| 2003/0211953 | A1 | 11/2003 | Glenn et al. |
| 2003/0215522 | A1 | 11/2003 | Johnson et al. |
| 2004/0038852 | A1 | 2/2004 | Brown |
| 2004/0058855 | A1 | 3/2004 | Schwartz et al. |
| 2004/0123402 | A1 | 7/2004 | Marsh et al. |
| 2004/0261198 | A1 | 12/2004 | Kainz et al. |
| 2004/0266656 | A1 | 12/2004 | Sakurai |
| 2005/0095215 | A1 | 5/2005 | Popp |
| 2005/0095261 | A1 | 5/2005 | Popp |
| 2005/0130859 | A1 | 6/2005 | Gupta et al. |
| 2005/0239723 | A1 | 10/2005 | Amin |
| 2005/0256313 | A1 | 11/2005 | Norenberg et al. |
| 2006/0009371 | A1 | 1/2006 | Wang et al. |
| 2006/0063692 | A1 | 3/2006 | Forst |
| 2006/0063695 | A1 | 3/2006 | Wang et al. |
| 2006/0130246 | A1 | 6/2006 | Molenda et al. |
| 2006/0180794 | A1 | 8/2006 | Goddard |
| 2006/0287219 | A1 | 12/2006 | Dykstra |
| 2008/0005715 | A1 | 1/2008 | Shimizu et al. |
| 2008/0057015 | A1 | 3/2008 | Oblong et al. |
| 2008/0075686 | A1 | 3/2008 | Fujii et al. |
| 2008/0145328 | A1 | 6/2008 | Schwartz |
| 2009/0071493 | A1 | 3/2009 | Nguyen et al. |
| 2009/0074700 | A1 | 3/2009 | Nguyen et al. |
| 2009/0092561 | A1 | 4/2009 | Lupia et al. |
| 2009/0119852 | A1 | 5/2009 | Marsh |
| 2010/0069338 | A1 | 3/2010 | Ward et al. |
| 2010/0115708 | A1 | 5/2010 | Caswell et al. |
| 2010/0195039 | A1 | 8/2010 | Park |
| 2010/0305020 | A1 | 12/2010 | Jennewein |
| 2011/0015120 | A1 | 1/2011 | Bortolin |
| 2011/0061174 | A1 | 3/2011 | Boutique |
| 2011/0183883 | A1 | 7/2011 | Hahn |
| 2011/0188784 | A1 | 8/2011 | Denome |
| 2012/0034181 | A1 | 2/2012 | Hoffmann et al. |
| 2012/0034182 | A1 | 2/2012 | Hoffmann et al. |
| 2012/0192823 | A1 | 8/2012 | Harle |
| 2013/0122070 | A1 | 5/2013 | Barnett |
| 2013/0174863 | A1 | 7/2013 | Marsh et al. |
| 2013/0333715 | A1 | 12/2013 | Hutton, III et al. |
| 2014/0079660 | A1 | 3/2014 | Doi |
| 2014/0147408 | A1 | 5/2014 | Williams |
| 2014/0201927 | A1 | 7/2014 | Bianchetti et al. |
| 2014/0213499 | A1 | 7/2014 | Chen et al. |
| 2014/0323383 | A1 | 10/2014 | Trujillo |
| 2014/0349902 | A1 | 11/2014 | Allef et al. |
| 2015/0011449 | A1 | 1/2015 | Snyder et al. |
| 2015/0030644 | A1 | 1/2015 | Oh et al. |
| 2015/0093420 | A1 | 4/2015 | Snyder et al. |
| 2015/0140052 | A1 | 5/2015 | Gizaw et al. |
| 2015/0182431 | A1 | 7/2015 | Chaudhuri |
| 2015/0217015 | A1 | 8/2015 | Williams |
| 2015/0267155 | A1 | 9/2015 | Brooker et al. |
| 2015/0275142 | A1 | 10/2015 | Hulskotter |
| 2015/0275144 | A1 | 10/2015 | Hulskotter et al. |
| 2015/0315525 | A1 | 11/2015 | Hulskotter |
| 2015/0353869 | A1 | 12/2015 | Stenger et al. |
| 2016/0068785 | A1 | 3/2016 | Vinson et al. |
| 2016/0090562 | A1 | 3/2016 | Loughnane et al. |
| 2016/0175210 | A1 | 6/2016 | Marsh et al. |
| 2016/0340625 | A1 | 11/2016 | Scheibel et al. |
| 2017/0067003 | A1 | 3/2017 | Souter et al. |
| 2017/0137745 | A1 | 5/2017 | Tang |
| 2017/0191004 | A1 | 7/2017 | Schmaelzle |
| 2017/0240848 | A1 | 8/2017 | Hulskotter |
| 2017/0253836 | A1 | 9/2017 | Scheibel |
| 2017/0253838 | A1 | 9/2017 | Scheibel et al. |
| 2017/0275565 | A1 | 9/2017 | Scialla et al. |
| 2017/0306267 | A1 | 10/2017 | Haetzelt et al. |
| 2018/0000705 | A1 | 1/2018 | Marsh |
| 2018/0000706 | A1 | 1/2018 | Marsh |
| 2018/0000713 | A1 | 1/2018 | Marsh |
| 2018/0000714 | A1 | 1/2018 | Marsh et al. |
| 2018/0000715 | A1 | 1/2018 | Marsh |
| 2018/0216053 | A1 | 8/2018 | Denome |
| 2019/0010426 | A1 | 1/2019 | Scialla |
| 2019/0336426 | A1 | 11/2019 | Marsh |
| 2020/0063066 | A1 | 2/2020 | Depoot et al. |
| 2020/0063067 | A1 | 2/2020 | Depoot et al. |
| 2020/0063068 | A1 | 2/2020 | Randall et al. |
| 2020/0063069 | A1 | 2/2020 | Randall et al. |
| 2020/0345607 | A1 | 11/2020 | Marsh et al. |
| 2020/0360254 | A1 | 11/2020 | Marsh |
| 2021/0230517 | A1 | 7/2021 | Baltsen et al. |

FOREIGN PATENT DOCUMENTS

| | | | |
|---|---|---|---|
| CN | 1224449 | A | 7/1999 |
| CN | 105492586 | A | 4/2016 |
| DE | 19536420 | A1 | 4/1996 |
| DE | 10259199 | A1 | 6/2004 |

(56) References Cited

FOREIGN PATENT DOCUMENTS

| | | | |
|---|---|---|---|
| DE | 102011079664 | A1 | 4/2012 |
| EP | 0232092 | A2 | 8/1987 |
| EP | 0647706 | A2 | 4/1995 |
| EP | 0921164 | A1 | 6/1999 |
| EP | 1046390 | A1 | 10/2000 |
| EP | 1714634 | A1 | 10/2006 |
| EP | 2067467 | A2 | 6/2009 |
| EP | 3138899 | A1 | 3/2017 |
| FR | 2853529 | A1 | 10/2004 |
| FR | 2853530 | A1 | 10/2004 |
| FR | 2853531 | A1 | 10/2004 |
| GB | 2288812 | A | 1/1995 |
| GB | 2315770 | A | 2/1998 |
| JP | S5286410 | A | 7/1977 |
| JP | S57109711 | A | 7/1982 |
| JP | S63150213 | A | 6/1988 |
| JP | H01162866 | A | 6/1989 |
| JP | 05262623 | A1 | 10/1993 |
| JP | 06041579 | A1 | 2/1994 |
| JP | H06306662 | A | 11/1994 |
| JP | H07258698 | A | 10/1995 |
| JP | H09183996 | A | 7/1997 |
| JP | H09291024 | A | 11/1997 |
| JP | H1147249 | A | 2/1999 |
| JP | H11139941 | A | 5/1999 |
| JP | 11180836 | A | 7/1999 |
| JP | 11269487 | A1 | 10/1999 |
| JP | 2004059540 | A1 | 2/2004 |
| JP | 2006160708 | A | 6/2006 |
| JP | 2008169183 | A1 | 7/2008 |
| JP | 5875766 | B2 | 1/2011 |
| JP | 2011046652 | A1 | 3/2011 |
| JP | 2011137192 | A | 7/2011 |
| JP | 2011219579 | A | 11/2011 |
| JP | 2012176105 | A | 9/2012 |
| JP | 2013051993 | A | 3/2013 |
| JP | 2014105411 | A | 6/2014 |
| JP | 2016214618 | A | 12/2016 |
| KR | 1020090077562 | A | 7/2009 |
| WO | 9116878 | A1 | 11/1991 |
| WO | 9311737 | A1 | 6/1993 |
| WO | 9804237 | A1 | 2/1998 |
| WO | 9824400 | A2 | 6/1998 |
| WO | 9911746 | A1 | 3/1999 |
| WO | 9963034 | A1 | 12/1999 |
| WO | 0049125 | A1 | 8/2000 |
| WO | 0051555 | A1 | 9/2000 |
| WO | 0051556 | A1 | 9/2000 |
| WO | 0063334 | A1 | 10/2000 |
| WO | 200119327 | A1 | 3/2001 |
| WO | 0125379 | A1 | 4/2001 |
| WO | 0176729 | A2 | 10/2001 |
| WO | 0220486 | A2 | 3/2002 |
| WO | 02065982 | A2 | 8/2002 |
| WO | 02102302 | A2 | 12/2002 |
| WO | 2005026302 | A1 | 3/2005 |
| WO | 2007066438 | A1 | 6/2007 |
| WO | 2007079793 | A1 | 7/2007 |
| WO | 2008136000 | A2 | 11/2008 |
| WO | 2008153050 | A1 | 12/2008 |
| WO | 2009110590 | A1 | 9/2009 |
| WO | 2009148801 | A1 | 12/2009 |
| WO | 2010106342 | A2 | 9/2010 |
| WO | 2011105449 | A1 | 9/2011 |
| WO | 2012011020 | A2 | 1/2012 |
| WO | 201220226 | A1 | 2/2012 |
| WO | 2012021472 | A1 | 2/2012 |
| WO | 2012126665 | A1 | 9/2012 |
| WO | 2014182766 | A1 | 11/2014 |
| WO | 2016106362 | A1 | 6/2016 |

OTHER PUBLICATIONS

US 7,709,429, 05/2017, Marsh, Jennifer Mary et al. (withdrawn)

Alberto Culver, Canada, Shampoo, Mintel GNPD, 2008, 3 Pages.

All Office Actions; U.S. Appl. No. 15/630,411, filed Jun. 22, 2017.

All Office Actions; U.S. Appl. No. 15/630,431, filed Jun. 22, 2017.

All Office Actions; U.S. Appl. No. 16/515,821, filed Jun. 22, 2017.

All Office Actions; U.S. Appl. No. 16/985,902, filed Jun. 22, 2017.

All Office Actions; U.S. Appl. No. 14/700,181, filed Apr. 30, 2015.

All Office Actions; U.S. Appl. No. 15/591,663, filed May 10, 2017.

Charles N Reilley et al., "Chelon Approach to Analysis (I) Survey of Theory and Application", Journal of Chemical Education, Online retrieved from https://pubs.acs.org/doi/pdf/10.1021/ed036p555?rand=jisnuiqf, vol. 36 No. 11, Nov. 1959 , pp. 555-564.

Gary W. Evans, "The Role of Picolinic acid in Metal Metabolism", Life Chemistry Reports, Jan. 1, 1982, pp. 57-67.

The Procter & Gamble, UK, 0% Grease Shampoo, Mintel, Feb. 2016, 2 Pages.

Vitality Unlimited, "What's A Picolinate?—Picolinic acid is the body's prime natural chelator", Dec. 30, 1989, 2 Pages.

Zurowska et al., "Structural and Magnetic characterization of Cu-picolinate and Cu-Quinaldine and their mixed complexes with water or halides", Inorganica Chemical Acta, vol. 418, May 2, 2014, pp. 136-152.

* cited by examiner

TREATMENT COMPOSITIONS COMPRISING A SURFACTANT SYSTEM AND AN OLIGOAMINE

FIELD OF THE INVENTION

The present disclosure relates to treatment compositions that include a surfactant system and an oligoamine. The present disclosure further relates to related methods of use and preparation of such compositions.

BACKGROUND OF THE INVENTION

Many treatment processes, such as laundry wash processes, are designed to eliminate soils from surfaces, such as fabrics. Some soils can cause malodors on fabrics, which may persist or even form after the treatment process is finished. Thus, manufacturers of consumer products and industrial cleaning products are continuously seeking to provide compositions and processes that provide improved malodor control.

Separately, certain polyamines or oligoamines are known to be used in detergent compositions. Such polyamines or oligoamines may facilitate certain cleaning benefits, such as grease removal. However, such compounds can cause discoloration such as yellowing on fabrics.

There is a need to provide composition that provide improved malodor control, particularly if such compositions can make more efficient use of oligoamines.

SUMMARY OF THE INVENTION

The present disclosure relates to treatment compositions having a certain oligoamine and/or salt thereof, and a particular surfactant system.

For example, the present disclosure relates to a treatment composition including an oligoamine and/or a salt thereof, and a surfactant system, where the oligoamine is present at a level of about 0.01% to 3.0%, by weight of the treatment composition, where the oligoamine has a structure according to according to Formula I:

Formula I

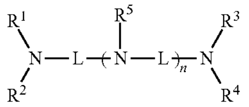

where each L is independently —$(C_mH_{m2})$—, where the index m is independently for each L an integer from 2 to 6, n is an integer from 1 to 10, and each of $R^1$-$R^5$ is independently selected from H and $C_1$-$C_4$ alkyl, typically where at least one of $R^1$-$R^5$ is H; and wherein the surfactant system includes linear alkyl benzene sulfonate (LAS) surfactant.

The present disclosure also relates to a process of treating a surface, the process including the steps of: (a) providing a surface, preferably a fabric, more preferably a fabric soiled with sebum, and (b) contacting the surface with a composition as described in the present disclosure, optionally in the presence of water.

The present disclosure also relates to a use of a surfactant system in a fabric care composition to improve malodor control benefits of an oligoamine and/or a salt thereof with relation to a target fabric, the surfactant system including linear alkyl benzene sulphonate surfactant, and where the oligoamine has a structure according to according to Formula I as described herein.

DETAILED DESCRIPTION OF THE INVENTION

The present disclosure relates to treatment compositions that include oligoamines and linear alkyl benzene sulfonate (LAS) surfactant. It has been found that such oligoamines can provide surprising malodor benefits, for example with regard to laundered fabrics, and that the benefits may be improved in compositions that include LAS.

Without wishing to be bound by theory, it is believed that metal ions, such as copper ions (e.g., $Cu^{2+}$), in a treatment liquor can facilitate the breakdown of certain soils, such as sebum, on a target surface. Such breakdown may release volatile, malodorous compounds into the air. It is believed that the oligoamines of the present disclosure can chelate and sequester copper ions in a treatment liquor, and thereby inhibit the release of such malodorous compounds.

Furthermore, it has been found that the combination of the present oligoamines and LAS surfactant can provide surprisingly good malodor control benefits. Without wishing to be bound by theory, it is believed that deposition of the oligoamines onto a target surface may be aided by the LAS surfactant, for example through hydrophobic interactions. The more efficiently the oligoamine is deposited, the more it can inhibit the breakdown of the malodor-causing soils. Such a benefit-causing mechanism is not intuitive, as oligoamines and anionic surfactants such as LAS typically provide benefits by removing soils from a surface. The LAS may be part of a surfactant system, which may comprise one or more additional surfactants.

The compositions and processes of the present disclosure are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, dryer sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As used herein, "liquid" includes free-flowing liquids, as well as pastes, gels, foams and mousses. Non-limiting examples of liquids include light duty and heavy duty liquid detergent compositions, fabric enhancers, detergent gels commonly used for laundry, bleach and laundry additives. Gases, e.g., suspended bubbles, or solids, e.g. particles, may be included within the liquids. Liquid compositions may have from about 0% to about 90%, or from about 30% to about 90%, or from about 50% to about 80%, by weight of the composition, of water, and may include non-aqueous liquid detergents.

A "solid" as used herein includes, but is not limited to, powders, agglomerates, and mixtures thereof. Non-limiting examples of solids include: granules, micro-capsules, beads, flakes, noodles, and pearlised balls.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Treatment Composition

The present disclosure relates to treatment compositions that are suitable for treating a surface. The treatment compositions may contain an oligoamine and a surfactant system that includes linear alkyl benzene sulfonate surfactant. The compositions may further include additional treatment adjuncts.

The treatment compositions of the present disclosure may be fabric care compositions. Such compositions may be used as a pre-laundering treatment, a post-laundering treatment, or may be added during the rinse or wash cycle of the laundering operation. It may also be used in a dry cleaning context.

The composition may be selected from the group of light duty liquid detergents compositions, heavy duty liquid detergent compositions, detergent gels commonly used for laundry, bleaching compositions, laundry additives, fabric enhancer compositions, and mixtures thereof. The composition may be a heavy duty liquid detergent composition or a fabric enhancer composition. The composition may be intended to be used during a wash cycle and/or during a rinse cycle of an automatic washing machine.

The composition may be in any suitable form. The composition may be in the form of a liquid composition, a granular composition, a single-compartment pouch, a multi-compartment pouch, a dissolvable sheet, a pastille or bead, a fibrous article, a tablet, a bar, a flake, a dryer sheet, or a mixture thereof. The composition can be selected from a liquid, solid, or combination thereof.

The cleaning composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The oligoamine and surfactant systems of the present disclosure are described in more detail below.

Oligoamine

The treatment compositions of the present disclosure include an oligoamine or a salt thereof. Oligoamines according to the present disclosure comprise amine functions, which can be primary, secondary, or tertiary amines, connected through specific alkylene groups. Without wishing to be bound by theory, it is believed that oligoamines of the present disclosure are well-suited for chelating certain metals, such as copper ($Cu^{2+}$), and that such chelation may provide malodor control benefits.

The treatment compositions of the present disclosure may comprise from about 0.01%, or from about 0.05%, to about 3.0%, or to about 2.0%, or to about 1.0%, or to about 0.75%, or to about 0.5%, or to about 0.4%, or to about 0.3%, or to about 0.2%, or to about 0.15%, or to about 0.1%, by weight of the treatment composition, of the oligoamine. For the purposes of the present disclosure, the weight percent of the linear oligoamine is calculated using the weight of the free base form. Depending on the intended use and/or formulation, relatively low levels (e.g., less than about 1%, or less than about 0.5%, or less than about 0.2%, or less than about 0.1%) of the oligoamine may be preferred, as amines can result in discoloration/yellowing of certain surfaces.

The oligoamines of the present disclosure may be considered linear oligoamines. By "linear," it is meant that there are no further amine-containing side chains grafted on the oligoamine backbone represented by Formula I. However, it is understood that the linear oligoamine may, at least in some cases, have alkyl groups that are attached to oligoamine backbone, such as methyl or ethyl groups.

The oligoamines of the present disclosure may have a structure according to Formula I:

Formula I

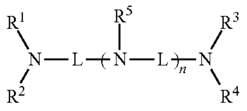

wherein each L is independently —($C_mH_{m2}$)—, wherein the index m is independently for each L an integer from 2 to 6, preferably m is 2 or 3, more preferably m is 2 (e.g., ethylene groups);

n is an integer from 1 to 10 (i.e. triamines, tetramines, pentamines, hexamines, heptamines, etc.), preferably from 1 to 5, more preferably from 1 to 3, even more preferably from 1 to 2, most preferably 1; and wherein each of $R^1$-$R^5$ is independently selected from H and $C_1$-$C_4$ alkyl, preferably H and methyl (i.e., $C_1$ alkyl). It is understood that when n is greater than 1, each $R^5$ is independently selected from the provided group, although each $R^5$ may be identical.

The index m may be independently for each L an integer from 2 to 6, wherein the index m is 2 or 3, preferably 2, for each of two L groups that are directly connected to a common N atom. It is believed that having two such L groups adjacent to a common N atom will facilitate improved metal sequestration, even if other L groups are relatively larger (e.g., have m being greater than 2).

Each of $R^1$-$R^5$ may be H. $R^5$ may be methyl. $R^5$ may be H. One or both of $R^1$ and $R^3$ may be methyl. $R^1$ and $R^3$ may be methyl, and $R^2$ and $R^4$ may both be hydrogen. Each of $R^1$-$R^5$ may be methyl. It may be preferred that at least one of $R^1$-$R^5$ is H, and even more preferred that at least one of $R^1$-$R^4$ is H. $R^1$-$R^4$ may be H, and $R^5$ may be independently selected from H and $C_1$ alkyl.

The present compositions may include an oligoamine having a structure according to Formula I above, wherein L, m, n, and $R^1$-$R^5$ are defined as above, with the proviso that if n is equal to 1, then $R^5$ is selected from H and a moiety having from 1 to 10 carbons, or from 1 to 6 carbons, or from 1 to 4 carbons.

Depending on the product type and/or overall benefit space desired, the formulator may select oligoamines having primary, secondary, and/or tertiary nitrogens, particularly at the terminal positions. Without wishing to be bound by theory, it is believed the presence of primary nitrogens in the present oligoamines may provide improved malodor control benefits, believed to be due to improved chelation efficiency and/or coordination to a target surface, such as a fabric. Also without wishing to be bound by theory, it is believed that tertiary nitrogens in the present oligoamines may result in fewer interactions with other materials in the treatment composition, for example reactions with certain perfume materials that may otherwise result in reactions (e.g., Schiff base reactions) and consequent color changes in liquid products.

Treatment compositions comprising mixtures of various oligoamines according to Formula I are also part of the scope of the present disclosure.

Suitable oligoamines according to the present disclosure may include diethylenetriamine (DETA), 4-methyl diethylenetriamine (4-MeDETA), dipropylenetriamine (DPTA), 5-methyl dipropylenetriamine (5-MeDPTA), triethylenetetraamine (TETA), 4-methyl triethylenetetraamine (4-MeTETA), 4,7-dimethyl triethylenetetraamine (4,7-Me2TETA), 1,1,4,7,7-pentamethyl diethylenetriamine (M5-DETA), tripropylenetetraamine (TPTA), tetraethylenepentaamine (TEPA), tetrapropylenepentaamine (TPPA), pentaethylenehexaamine (PEHA), pentapropylenehexaamine (PPHA), hexaethyleneheptaamine (HEHA), hexapropyleneheptaamine (HPHA), N,N'-Bis(3-aminopropyl)ethylenediamine, or mixtures thereof.

The oligoamine may preferably be selected from diethylenetriamine (DETA), 4-methyl diethylenetriamine (4-MeDETA), 1,1,4,7,7-pentamethyl diethylenetriamine (M5-DETA), dipropylenetriamine (DPTA), 5-methyl dipropylenetriamine (5-MeDPTA), triethylenetetramine (TETA), tripropylenetetraamine (TPTA), tetraethylenepentaamine (TEPA), tetrapropylenepentaamine (TPTA), N,N'-Bis(3-aminopropyl)ethylenediamine, and mixtures thereof, more preferably diethylenetriamine (DETA), 4-methyl diethylenetriamine (4-MeDETA), 1,1,4,7,7-pentamethyl diethylenetriamine (M5-DETA), triethylenetetramine (TETA), tetraethylenepentaamine (TEPA), N,N'-Bis(3-aminopropyl)ethylenediamine, and mixtures thereof, even more preferably diethylenetriamine (DETA), 4-methyl diethylenetriamine (4-MeDETA), N,N'-Bis(3-aminopropyl)ethylenediamine, and mixtures thereof, most preferably diethylenetriamine (DETA). DETA may be preferred due to its low molecular weight and/or relatively low cost to produce.

The oligoamine may comprise diethylene triamine ("DETA," where m is equal to 2, n is equal to 1, and each of $R^1$-$R^5$ is H), or a derivative thereof, including alkylated forms (e.g., where one or more of $R^1$-$R^5$ is an alkyl group, such as methyl). The oligoamine may comprise at least 80% or even at least 90% or even at least 95% by weight of the oligoamine of a form of diethylene triamine (DETA), even more preferably the oligoamine consists of a form of diethylene triamine (DETA). The oligoamine may be selected from: DETA; 4-methyl DETA; and mixtures thereof; preferably DETA (unalkylated diethylene triamine).

Depending on the finished product or wash solution pH, the nitrogen atoms may be protonated, partially or fully, resulting in the salt form of the oligoamine according to Formula I. These (partially) protonated oligoamines are also considered as part of the scope of the present disclosure. It may be that when the oligoamine is in salt form, the salt is not a salt of an anionic surfactant.

The oligoamines of the present disclosure may have a molecular weight of between about 100 to about 1200 Da, or from about 100 to about 900 Da, or from about 100 to about 600 Da, or from about 100 to about 400 Da, preferably between about 100 Da and about 250 Da, most preferably between about 100 Da and about 175 Da, or even between about 100 Da and about 150 Da. For purposes of the present disclosure, the molecular weight is determined using the free base form of the oligoamine.

A skilled person in the art will know how to obtain oligoamines according to the present disclosure. For example, oligoamines according to Formula I where L has m equal to 2 may be obtained by reactions involving ammonia and ethylene dichloride, followed by fractional distillation. The common oligoamines obtained are diethylenetriamine (DETA), triethylenetetramine (TETA), and tetraethylenepentamine (TEPA). Other oligoamines according to Formula I may be formed, where m is equal to from 2 to 6 via use of the appropriate halogen-disubstituted alkylenes.

Above the pentamines, i.e the hexamines, heptamines, octamines, and possibly nonamines, the cogenerically derived mixture does not appear to separate by distillation and can include other materials such as cyclic amines and particularly piperazines.

Suitable ethylene-based oligoamines according to the present disclosure are commercially available from multiple chemical suppliers including Dow, BASF, Huntsman, and Akzo Nobel Corporations.

Surfactant System

The treatment compositions of the present disclosure comprise a surfactant system. The surfactant system comprises linear alkyl benzene sulfonate (LAS). The surfactants of the surfactant system may be synthetically derived, naturally derived, or mixtures thereof. The surfactants of the surfactant system may be derived from petroleum, waste (such as plastic waste), or renewable sources.

The surfactant system may consist of one type of surfactant (e.g., LAS). The surfactant system may include more than one surfactant. In particular, laundry detergents (such as heavy duty liquid laundry detergents) may include surfactant systems that include LAS and at least a second surfactant. The surfactant system may include a second surfactant, which may be selected from alkyl ethoxylated sulfate (AES), nonionic ethoxylated alcohol, alkyl ethoxylated carboxylate (AEC), or mixtures thereof.

The compositions of the present disclosure may include from about from about 1% to about 90%, or from about 1% to about 80%, or from about 1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 90%, or from about 25% to about 70%, or from about 30% to about 50%, by weight of the composition, of a surfactant system.

1. Linear Alkyl Benzene Sulfonate (LAS) Surfactant

The treatment compositions and surfactant systems of the present disclosure may include linear alkyl benzene sulfonate surfactant, otherwise known as “LAS.” LAS is a common anionic surfactant used in various cleaning applications and products, such as laundry detergents.

The LAS surfactant contains an alkyl group in a straight chain, or linear, configuration. Linear alkyl groups are typically preferred to branched groups for environmental reasons.

The alkyl group may contain, as an average by weight, from about 9 to about 15 carbon atoms, or from about 11 to about 14, or from about 11 to about 13, or from about 11 to about 12, or about 11.8 carbon atoms. In the latter case, the material may be abbreviated as C11.8 LAS.

The LAS may include 2-phenyl alkyl benzene sulfonate, where a benzene ring is attached the alkyl group at a carbon atom that is adjacent to the terminal carbon of the substantially linear chain. Thus, the carbon atom that is attached to the benzene ring has a methyl group and another alkyl group attached to it in a 2-phenyl alkylbenzene. It is most common and preferred that the sulfonate group is attached to the benzene rig n the para-position with respect to the alkyl group. The LAS may comprise at least 15% of the 2-phenyl LAS isomer, or at least 20% of the 2-phenyl isomer.

The LAS may be in acid form (known as HLAS) and/or in salt form. Suitable salts may be formed from alkali metal hydroxides, alkaline earth hydroxides, ammonium hydroxides, alkylammonium hydroxides, alkanolamines such as monoethanolamine, or any other chemical agent known by those skilled in the art to react with linear alkyl benzene sulfonic acids to form water-soluble linear alkyl benzene sulfonates. Alkali metal salts, typically sodium, and/or alkanolamine salts, typically monoethanolamine, of LAS may be preferred.

It may be desirable for the LAS to be preneutralized, for example neutralized prior to being combined with the oligoamines of the present disclosure. This may be preferred for improved pH control and/or to improve the malodor control performance of the oligoamine.

Linear alkylbenzene is typically manufactured on an industrial scale using one of three commercial processes which differ from one another primarily by virtue of the catalyst system employed. One process employs an aluminum trichloride catalyst, another process uses a hydrogen fluoride catalyst, while the third process uses solid alkylation catalyst, known as DETAL™. Suitable alkyl benzene sulphonate (LAS) may be obtained by sulphonating commercially available linear alkyl benzene (LAB). Suitable LAB includes low 2-phenyl LAB, such as those supplied by Sasol under the tradename Isochem® or those supplied by Petresa under the tradename Petrelab®. Other suitable LAB include high 2-phenyl LAB, such as those supplied by Sasol under the tradename Hyblene®.

The surfactant system may comprise at least about 5%, or at least about 10%, or at least about 20%, or at least about 25%, or at least about 30%, or at least about 40%, or at least about 50%, or at least about 60%, or at least about 70%, or at least about 75%, or at least about 80%, or at least about 90%, or even about 100%, by weight of the surfactant system, of LAS. The surfactant system may comprise no greater than about 95%, or no greater than about 90%, or no greater than about 80%, or no greater than about 75%, or no greater than about 70%, or no greater than about 60%, or no greater than about 50%, or no greater than about 40%, or no greater than about 30%, no greater than about 25%, or no greater than about 20%, or no greater than about 15%, or no greater than about 10%, by weight of the surfactant system, of LAS.

The treatment compositions may comprise from about 1%, or from about 2%, or from about 3%, or from about 5%, or from about 8%, or from about 10%, or from about 15%, or from about 20%, to about 60%, or to about 50%, or to about 40%, to about 30%, or to about 25%, or to about 20%, by weight of the treatment composition, of LAS.

2. Alkyl Ethoxylated Sulfate

The treatment compositions and surfactant systems of the present disclosure may include alkyl ethyoxylated sulfate (AES) surfactant. The second surfactant may include AES.

AES, also known as alkyl ether sulfates, alkyl polyethoxylate sulfates, or ethoxylated alkyl sulfates, may include water-soluble salts, particularly the alkali metal, ammonium and alkylolammonium salts, of organic sulfuric reaction products having in their molecular structure an alkyl group containing from about 8 to about 30 carbon atoms and a sulfonic acid and its salts. Included in the term “alkyl” may be the alkyl portion of acyl groups.

The alkyl group of the AES may contain from about 8 to about 30, or from about 10 to about 18, or from about 12 to about 16 carbon atoms. The AES surfactant may be a mixture of alkyl ether sulfates, the mixture having an average (arithmetic mean) carbon chain length (by weight) within the range of about 12 to 30 carbon atoms, and in some examples an average carbon chain length of about 12 to 15 carbon atoms.

The AES may have an average (arithmetic mean) degree of ethoxylation of from about 1 mol to about 8 mols, or to about 6 mols, or to about 5 mols, or to about 4 mols, or to about 3 mols of ethylene oxide. The AES may have an average (arithmetic mean) degree of ethoxylation of from about 1.8 mols to about 2.5 mols of ethylene oxide. The alkyl ether sulfate surfactant may contain a peaked ethoxylate distribution.

The AES may have an average carbon chain length between about 10 carbon atoms to about 18 carbon atoms, and an average degree of ethoxylation of from about 1 to about 6 mols of ethylene oxide. Suitable AES surfactants may have an average carbon chain length of from about 12 to about 15 carbon atoms, preferably from about 13 to about 15 carbon atoms, and an average degree of ethoxylation of from about 1 to about 3 mols of ethylene oxide, preferably from about 1.5 to about 2.5 mols of ethylene oxide.

The LAS and the AES may be present in a weight ratio. The weight ratio of LAS to AES may be from about 10:90 to about 99:1, or from about 50:50 to about 99:1, or from about 50:50 to about 90:10, or from about 80:20 to about 90:10.

The treatment composition may be substantially free of AES.

3. Nonionic Ethoxylated Alcohol

The treatment compositions and surfactant systems of the present disclosure may include nonionic ethoxylated alcohol. The second surfactant may include nonionic ethoxylated alcohol.

The nonionic ethoxylated alcohol may be of the formula $R(OC_2H_4)_nOH$, wherein R is selected from the group consisting of aliphatic hydrocarbon radicals containing, on average, from about 8 to about 18, or from 10 to about 16 carbon atoms, and wherein the average value of n is from about 5 to about 15, or from about 6 to about 10, or from about 7 to about 9. Suitable materials of this type may include $C_8$-$C_{18}$ alkyl ethoxylates, such as, NEODOL® nonionic surfactants from Shell.

The LAS and nonionic ethoxylated alcohol may be present in a weight ratio. The weight ratio of LAS to nonionic ethoxylated alcohol surfactant may be from about 10:90 to about 99:1, or from about 50:50 to about 99:1, or from about 50:50 to about 90:10, or from about 80:20 to about 90:10.

The treatment composition may be substantially free of nonionic ethoxylated alcohol surfactant.

4. Alkyl Ethoxylated Carboxylate

The treatment compositions and surfactant systems of the present disclosure may include alkyl ethyoxylated carboxylate (AEC) surfactant, also known as alkyl ether carboxylates. The second surfactant may include AEC.

AEC surfactants may have the general formula R2-$(OCH_2CH_2)_n$—$OCH_2COOH$, where $R^2$ is an alkyl chain, preferably an alkyl chain having, by weight average, from about 10 to about 20 carbon atoms, and where n is, by weight average, from about 1 to about 15, or from about 3 to about 11. The alkyl chain may be linear or branched, preferably linear. The alkyl chain may be aliphatic or contain one cis or trans double bond. The alkyl chain (e.g., $R^2$) may be selected from: $CH_3(CH_2)_{11}$, $CH_3(CH_2)_{13}$, $CH_3(CH_2)_{15}$, $CH_3(CH_2)_{17}$, and $CH_3(CH_2)_7CH{=}(CH_2)_8$.

The AEC surfactant may be present in acid/protonated form, in salt form, or both. Suitable salts may be sodium salts and/or amine salts. The AEC may be, at least in part, preneutralized. Weights of the AECs are calculated as the protonated form.

Alkyl ether carboxylic acid are available from Kao (Akypo®), Huntsman (Empicol®) and Clariant (Emulsogen®) and Sasol (Marlowet®). An example of a $C_{12}$-$C_{14}$ alcohol polyethylene glycol ether carboxylic acid is Marlowet 4541, commercially available from Sasol. The sodium salt of the alkyl ether carboxylate may be used.

The LAS and AEC may be present in a weight ratio. The weight ratio of LAS to AEC may be from greater than about 50:50 to 99:1, or from about 60:40 to about 95:5, or from about 75:25 to about 90:10.

The treatment composition may be substantially free of AEC surfactant.

5. Other Surfactants

The treatment compositions and surfactant systems may include any other suitable surfactant. The second surfactant may comprise any other suitable surfactant.

Other suitable surfactants may include zwitterionic surfactant. The zwitterionic surfactant may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

Other suitable surfactants may include other anionic surfactants, which may be linear or branched. Other anionic surfactant may include non-alkoxylated alkyl sulfates, such as those produced by the sulfation of higher $C_5$-$C_{20}$ fatty alcohols. Other suitable anionic surfactants may include methyl ester sulfonates, paraffin sulfonates, α-olefin sulfonates, internal olefin sulfonates, and mixtures thereof. The other anionic surfactant may include a mid-chain branched anionic surfactant, e.g., a mid-chain branched anionic detersive surfactant, such as, a mid-chain branched alkyl sulphate and/or a mid-chain branched alkyl benzene sulphonate. The other anionic surfactant may include a 2-alkyl branched primary alkyl sulfates, such as those derived from the oxo process; such materials are commercially available from Sasol, e.g., under the trade names LIAL® and ISALCHEM® (which is prepared from LIAL® alcohols by a fractionation process). C14/C15 branched primary alkyl sulfates are also commercially available, e.g., namely LIAL® 145 sulfate. The mole ratio of total anionic surfactant to protonatable amines in the oligoamine may be less than about 15:1. In such cases, the oligoamine may have a structure according to Formula I, wherein index n is an integer from 2 to 5.

Other suitable surfactants may include other nonionic surfactants, such as $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic© from BASF; $C_{14}$-$C_{22}$ mid-chain branched alcohols, BA; $C_{14}$-$C_{22}$ mid-chain branched alkyl alkoxylates, $BAE_x$, wherein x is from 1 to 30; alkylpolysaccharides; specifically alkylpolyglycosides; polyhydroxy fatty acid amides; and ether capped poly(oxyalkylated) alcohol surfactants.

Other suitable surfactants may include cationic surfactants, such as the quaternary ammonium surfactants, which can have up to 26 carbon atoms and may include alkoxylate quaternary ammonium (AQA) surfactants, dimethyl hydroxyethyl quaternary ammonium, and/or dimethyl hydroxyethyl lauryl ammonium chloride; polyamine cationic surfactants; cationic ester surfactants; amino surfactants, e.g., amido propyldimethyl amine (APA); and mixtures thereof.

Other suitable surfactants my include amphoteric surfactants, such as aliphatic derivatives of secondary or tertiary amines, or aliphatic derivatives of heterocyclic secondary and tertiary amines in which the aliphatic radical may be straight or branched-chain and where one of the aliphatic substituents contains at least about 8 carbon atoms, or from about 8 to about 18 carbon atoms, and at least one of the aliphatic substituents contains an anionic water-solubilizing group, e.g. carboxy, sulfonate, sulfate. Suitable amphoteric surfactants may also include sarcosinates, glycinates, taurinates, and mixtures thereof.

Additional Treatment Adjunct

The treatment compositions of the present disclosure may include one or more additional treatment adjunct. The additional treatment adjuncts may be suitable for delivering a treatment benefit to a target surface, such as a fabric or other textile. Treatment adjuncts, as used herein, may also include agents that facilitate chemical or physical stability in the treatment compositions, such as buffers, structurants/thickeners, and/or carriers.

The treatment adjunct(s) may be present in the composition at levels suitable for the intended use of the composition. Typical usage levels range from as low as 0.001% by weight of composition for adjuncts such as optical brighteners to 50% by weight of composition for builders/chelants.

The treatment adjunct may include antioxidant, hueing agent, optical brightener, additional chelating agents, enzymes, fatty acids and/or salts thereof, encapsulated benefit agents, soil release polymers, builders, dye transfer inhibiting agents, dispersants, enzyme stabilizers, catalytic materials, bleaching agents, bleach catalysts, bleach activators, polymeric dispersing agents, soil removal/anti-redeposition agents, polymeric grease cleaning agents, amphiphilic copolymers, suds suppressors, aesthetic dyes, perfume (including encapsulated perfume), structure elasticizing agents, fabric softeners, carriers, fillers, hydrotropes, solvents, antimicrobial agents and/or preservatives, neutralizers and/or pH adjusting agents, processing aids, fillers, rheology modifiers or structurants, opacifiers, pearlescent agents, pigments, anti-corrosion and/or anti-tarnishing agents, antifoams, chlorine scavengers, and mixtures thereof.

The treatment adjunct may include an antioxidant, a whitening or brightening agents such as a hueing agent or an optical brightener, an additional chelant, an enzyme, or mixtures thereof. The additional adjunct may include an encapsulated benefit agent, which may be encapsulated perfume, preferably where the encapsulated perfume comprises a shell surrounding a core, preferably where the shell comprises amine compounds and/or acrylate polymers.

Several treatment adjuncts are discussed in more detail below.

Fabric Conditioning Active

The treatment compositions of the present disclosure may include a fabric conditioning active (FCA). Compositions comprising such actives, such as liquid fabric enhancing compositions, may be useful for providing various benefits to target fabrics, including softness, anti-wrinkle, anti-static, conditioning, anti-stretch, color and/or appearance benefits. Fabric conditioning actives (FCAs) suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof.

Antioxidant

The compositions of the present disclosure may include an antioxidant. Without wishing to be bound by theory, it is believed that antioxidants may help to improve malodor control and/or cleaning performance of the compositions, particularly in combination with the oligoamines of the present disclosure. Antioxidants may also help to reduce yellowing that may be associated with amines, allowing the amines to be formulated at a relatively higher level. Antioxidants are substances as described in Kirk-Othmer (Vol. 3, page 424) and in Ullmann's Encyclopedia (Vol. 3, page 91).

The compositions of the present disclosure may include an antioxidant, preferably a hindered phenol antioxidant, in an amount of from about 0.001% to about 2%, preferably from about 0.01% to about 0.5%, by weight of the composition.

Suitable antioxidants may include alkylated phenols, having the general formula:

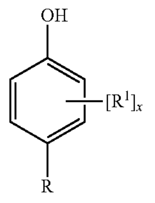

wherein R is $C_1$-$C_{22}$ linear alkyl or $C_3$-$C_{22}$ branched alkyl, each (1) having optionally therein one or more ester (—$CO_2$—) or ether (—O—) links, and (2) optionally substituted by an organic group comprising an alkyleneoxy or polyalkyleneoxy group selected from EO (ethoxy), PO (propoxy), BO (butoxy), and mixtures thereof, more preferably from EO alone or from EO/PO mixtures; R may preferably be methyl, branched $C_3$-$C_6$ alkyl, or $C_1$-$C_6$ alkoxy, preferably methoxy; $R^1$ is a $C_3$-$C_6$ branched alkyl, preferably tert-butyl; x is 1 or 2.

Preferred types of alkylated phenols having this formula may include hindered phenolic compounds. As used herein, the term "hindered phenol" is used to refer to a compound comprising a phenol group with either (a) at least one $C_3$ or higher branched alkyl, preferably a $C_3$-$C_6$ branched alkyl, preferably tert-butyl, attached at a position ortho to at least one phenolic —OH group, or (b) substituents independently selected from the group consisting of a $C_1$-$C_6$ alkoxy, preferably methoxy, a $C_1$-$C_{22}$ linear alkyl or $C_3$-$C_{22}$ branched alkyl, preferably methyl or branched $C_3$-$C_6$ alkyl, or mixtures thereof, at each position ortho to at least one phenolic —OH group. If a phenyl ring comprises more than one —OH group, the compound is a hindered phenol provided at least one such —OH group is substituted as described immediately above. Where any R group in the structure above comprises three or more contiguous monomers, that antioxidant is defined herein as a "polymeric hindered phenol antioxidant." Compositions according to the present disclosure may include a hindered phenol antioxidant. A preferred hindered phenol antioxidant includes 3,5-di-tert-butyl-4-hydroxytoluene (BHT).

A further class of hindered phenol antioxidants that may be suitable for use in the composition is a benzofuran or benzopyran derivative having the formula:

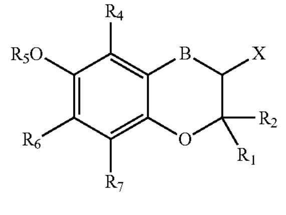

wherein $R_1$ and $R_2$ are each independently alkyl or $R_1$ and $R_2$ can be taken together to form a $C_5$-$C_6$ cyclic hydrocarbyl moiety; B is absent or $CH_2$; $R_4$ is $C_1$-$C_6$ alkyl; $R_5$ is hydrogen or —C(O)$R_3$ wherein $R_3$ is hydrogen or $C_1$-$C_{19}$ alkyl; $R_6$ is $C_1$-$C_6$ alkyl; $R_7$ is hydrogen or $C_1$-$C_6$ alkyl; X is —$CH_2$OH, or —$CH_2$A wherein A is a nitrogen-comprising unit, phenyl, or substituted phenyl. Preferred nitrogen-comprising A units include amino, pyrrolidino, piperidino, morpholino, piperazino, and mixtures thereof.

Suitable hindered phenol antioxidants may include: 2,6-bis(1,1-dimethylethyl)-4-methyl-phenol; 3,5-bis(1,1-dimethylethyl)-4-hydroxy-benzenepropanoic acid, methyl ester; 3,5-bis(1,1-dimethylethyl)-4-hydroxybenzenepropanoic acid, octadecyl ester; or mixtures thereof.

Commercially available antioxidants that may be suitable include BHT, RALOX 35™, and/or TINOGARD TS™.

Additional antioxidants may be employed. Examples of suitable antioxidants for use in the composition include, but are not limited to, the group consisting of α-, β-, γ-, δ-tocopherol, ethoxyquin, 2,2,4-trimethyl-1,2-dihydroquinoline, 2,6-di-tert-butyl hydroquinone, tert-butyl hydroxyanisole, lignosulphonic acid and salts thereof, and mixtures thereof. It is noted that ethoxyquin (1,2-dihydro-6-ethoxy-2,2,4-trimethylquinoline) is marketed under the name Raluquin™ by the company Raschig™. Other types of antioxidants that may be used in the composition are 6-hydroxy-2,5,7,8-tetramethylchroman-2-carboxylic acid (Trolox™) and 1,2-benzisothiazoline-3-one (Proxel GXL™). Antioxidants such as tocopherol sorbate, butylated hydroxyl benzoic acids and their salts, gallic acid and its alkyl esters, uric acid and its salts, sorbic acid and its salts, and dihydroxyfumaric acid and its salts may also be useful. Other useful antioxidants may include tannins, such as tannins selected from the group consisting of gallotannins, ellagitannins, complex tannins, condensed tannins, and combinations thereof.

The use of non-yellowing antioxidants, such as non-yellowing hindered phenol antioxidants, may be preferred. Antioxidants that form such yellow by-products may be avoided if they lead to perceptible negative attributes in the consumer experience (such as deposition of yellow by-products on fabric, for example). The skilled artisan is able to make informed decisions regarding the selection of antioxidants to employ.

Whitening/Brightening Agent

The additional treatment adjuncts of the present disclosure may include a whitening or brightening agent. Such agents may be selected from a hueing agent, an optical brightener, or mixtures thereof. The use of such agents may further reduce the effects of discoloration or yellowing and may enable formulation of the oligoamines at higher levels.

The compositions of the present disclosure may include a hueing agent. It has surprisingly been found that graft polymers according to the present disclosure may inhibit transfer of fugitive dyes, while having little effect on the deposition and/or performance of hueing agents on target fabrics.

Hueing agents (sometimes referred to as hueing dyes, fabric shading dyes, or bluing or whitening agents) typically provides a blue or violet shade to fabric. Such agent(s) are well known in the art and may be used either alone or in combination to create a specific shade of hueing and/or to shade different fabric types. The hueing agent may be selected from any suitable chemical class of dye as known in the art, including but not limited to acridine, anthraquinone (including polycyclic quinones), azine, azo (e.g., monoazo, disazo, trisazo, tetrakisazo, polyazo), benzodifurane, benzodifuranone, carotenoid, coumarin, cyanine, diazahemicyanine, diphenylmethane, formazan, hemicyanine, indigoids, methane, naphthalimides, naphthoquinone, nitro, nitroso, oxazine, phthalocyanine, pyrazoles, stilbene, styryl, triarylmethane, triphenylmethane, xanthenes and mixtures thereof. The hueing agent may be selected from an azo agent, a triarylmethane agent, a triphenylmethane agent, or mixtures thereof.

Suitable hueing agents include fabric shading dyes such as small molecule dyes, polymeric dyes, and dye-clay conjugates. Preferred fabric shading dyes are selected from small molecule dyes and polymeric dyes. Suitable small molecule dyes may be selected from the group consisting of dyes falling into the Colour Index (C.I., Society of Dyers and Colourists, Bradford, UK) classifications of Acid, Direct, Basic, Reactive, Solvent or Disperse dyes.

Suitable polymeric dyes include dyes selected from the group consisting of polymers containing covalently bound (sometimes referred to as conjugated) chromogens, (also known as dye-polymer conjugates), for example polymers with chromogen monomers co-polymerized into the backbone of the polymer and mixtures thereof. Preferred polymeric dyes comprise the optionally substituted alkoxylated dyes, such as alkoxylated triphenyl-methane polymeric colourants, alkoxylated carbocyclic and alkoxylated heterocyclic azo colourants including alkoxylated thiophene polymeric colourants, and mixtures thereof, such as the fabric-substantive colorants sold under the name of Liquitint® (Milliken, Spartanburg, South Carolina, USA).

Suitable dye clay conjugates include dye clay conjugates selected from the group comprising at least one cationic/basic dye and a smectite clay; a preferred clay may be selected from the group consisting of Montmorillonite clay, Hectorite clay, Saponite clay and mixtures thereof.

Pigments are well known in the art and may also be used as hueing agents in the fabric care compositions disclosed herein. Suitable pigments may include C.I Pigment Blues 15 to 20, especially 15 and/or 16, C.I. Pigment Blue 29, C.I. Pigment Violet 15, Monastral Blue, and mixtures thereof.

The amount of adjunct hueing agent present in a laundry care composition of the invention may be from 0.0001 to 0.05 wt % based on the total cleaning composition, preferably from 0.0001 to 0.005 wt %. Based on the wash liquor, the concentration of hueing agent may be from 1 ppb to 5 ppm, preferably from 10 ppb to 500 ppb.

The compositions of the present disclosure may include an optical brightener. Brighteners, also sometimes referred to as fluorescent whitening agents, may emit at least some visible light.

Commercial optical brighteners, which may be used herein, can be classified into subgroups, which include, but are not necessarily limited to, derivatives of stilbene, pyrazoline, coumarin, carboxylic acid, methinecyanines, dibenzothiphene-5,5-dioxide, azoles, 5- and 6-membered-ring heterocycles, and other miscellaneous agents. The brighteners may be added in particulate form or as a premix with a suitable solvent, for example nonionic surfactant, monoethanolamine, and/or propane diol.

Suitable fluorescent brighteners may include: disodium 4,4'-bis{[4-anilino-6-morpholino-s-triazin-2-yl]-amino}-2,2'-stilbenedisulfonate (Brightener 15, commercially available under the tradename Tinopal AMS-GX by BASF); disodium 4,4'-bis{[4-anilino-6-(N-2-bis-hydroxyethyl)-s-triazine-2-yl]-amino}-2,2'-stilbenedisulonate (commercially available under the tradename Tinopal UNPA-GX by BASF); disodium 4,4'-bis{[4-anilino-6-(N-2-hydroxyethyl-N-methylamino)-s-triazine-2-yl]-amino}-2,2'-stilbenedisulfonate (commercially available under the tradename Tinopal 5BM-GX by BASF); and/or disodiur 4,4'-bis((4-am-ino-6-anilino-13.5 triazin-2-yi)amino)stilbene-2,2'-disulphonate (Brightener 49). The brightener may be Brightener 49, Brightener 15, Brightener 3, or mixtures thereof.

Additional Chelating Agent

The additional treatment adjuncts of the present disclosure may comprise an additional chelating agent (also known as a chelant or a chelator). The additional chelating agent may be selected so as to have an affinity for a metal ion that is different than the metal ion for which the oligoamine has an affinity. For example, DETA, an oligoamine according to the present disclosure, has a particular affinity for copper ions, whereas DTPA, a different chelating agent, has a particular affinity for calcium ions. Thus, a composition having a combination of chelating agents may provide a broad spectrum of sequestration, and thereby provide improved performance. It may be preferable to couple a copper-chelating agent, such as the oligoamines of the present disclosure, with a calcium-chelating agent, such as DTPA and/or HEDP, in order to optimize cleaning performance, for example, by improving/maximizing the chelant load in the composition's formulation while maintaining enzyme stability.

The additional chelating agent may be present at a level of from about 0.10% to about 10%, or to about 5%, or to about 2%, by weight of the composition. The oligoamine and the additional chelating agent(s) may be present in the treatment composition at a combined level of from about 0.1% to about 10%, preferably to about 5%, by weight of the treatment composition. The weight ratio of the oligoamine to the additional chelating agent may be from about 10:1 to about 1:50, or from about 2:1 to about 1:25, or from about 1:1 to about 1:25, or from about 1:2 to about 1:20. The amount present by weight of oligoamine may be less than the amount present by weight of the additional chelating agent.

Suitable additional chelating agents may include phosphonates, aminocarboxylates, organic phosphonates, polyfunctionally-substituted aromatic chelating agents, or mixtures thereof, preferably aminocarboxylates.

Aminocarboxylates useful as chelating agents include, but are not limited to, ethylenediaminetetracetates, N-(hydroxyethyl)ethylenediaminetriacetates, nitrilotriacetates, ethylenediamine tetraproprionates, triethylenetetraaminehexacetates, diethylenetriamine-pentaacetates, and ethanoldiglycines, alkali metal, ammonium, and substituted ammonium salts thereof, and mixtures thereof. Organic phosphonates are also suitable for use as chelating agents in the compositions of the invention when low levels of total phosphorus are permitted, and include ethylenediaminetetrakis (methylenephosphonates) available under the trademark DEQUEST from Monsanto, diethylene triamine penta (methylene phosphonate), ethylene diamine tri (methylene phosphonate), hexanethylene diamine tetra (methylene phosphonate), α-hydroxy-2 phenyl ethyl diphosphonate, methylene diphosphonate, hydroxy 1,1-hexylidene, vinylidene 1,1 diphosphonate, 1,2 dihydroxyethane 1,1 diphosphonate and hydroxy-ethylene 1,1 diphosphonate; the phosphonates may not contain alkyl or alkenyl groups with more than 6 carbon atoms. Polyfunctionally-substituted aromatic chelating agents may include catechols, for example sulphonated catechols.

The additional chelant may include: DTPA (diethylenetriaminepentaacetic acid), HEDP (hydroxyethanediphosphonic acid), EDDS (ethylenediamine disuccinate (EDDS), DTPMP (diethylene triamine penta (methylene phosphonic acid)), EDTMP (ethylene diamine tetra(methylene phosphonic acid)), Tiron® (1,2-diydroxybenzene-3,5-disulfonic acid), HPNO (2-pyridinol-N-oxide), MGDA (methylglycinediacetic acid), GLDA (glutamic-N,N-diacetic acid), any suitable derivative thereof, salts thereof, and mixtures thereof.

As used herein, traditional builders, such as citric acid and carbonates, are not considered chelants and are not included when determining percentage levels or weight ratios.

Enzymes

The treatment compositions of the present disclosure may include one or more enzymes that provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, ß-glucanases, arabinosidases, hyaluronidase, chondroitinase, laccase, amylases, nucleases (such as deoxyribonuclease and/or ribonuclease), phosphodiesterases, or mixtures thereof. Particularly preferred may be a mixture of protease, amylase, lipase, cellulase, phosphodiesterase, and/or pectate lyase. Compositions of the present disclosure may include a oligoamine of the present disclosure, a calcium-binding chelant such as DTPA, and amylase.

Other Agents

The treatment compositions of the present disclosure may include solvent, preferably organic solvent, such as a non-aminofunctional organic solvent. Suitable organic solvents may include glycerol, ethylene glycol, 1,3 propanediol, 1,2 propanediol, tetramethylene glycol, pentamethylene glycol, hexamethylene glycol, 2,3-butane diol, 1,3 butanediol, diethylene glycol, triethylene glycol, polyethylene glycol, glycerol formal dipropylene glycol, polypropylene glycol, dipropylene glycol n-butyl ether, and mixtures thereof.

The treatment compositions of the present disclosure may include chlorine scavengers. It is believed that chlorine ions in a treatment liquor, for example from hypochlorite bleach or naturally occurring in the water source, may contribute to color fading or other discoloration. A chlorine scavenger may be incorporated at a level adequate to neutralize at least about 1 ppm, or at least about 2 ppm, or at least about 5 ppm, or at least about 10 ppm chlorine in a treatment liquor. Chlorine scavengers may include amines (other than the oligoamines described above) and/or ammonium salts. Preferred amines may include those that comprise primary and/or secondary amines, and may include alkanolamines such as monoethanolamine (MEA), diethanolamine (DEA), and/or triethanolamine (TEA).

The treatment compositions of the present disclosure may contain cleaning and/or dispersing polymers, which may provide cleaning and/or whiteness benefits. Suitable cleaning and/or dispersing polymers may include: polymeric soil release agents, which may be anionic or nonionic and/or may include a terephthalate moiety; alkoxylated polyamines, such as ethoxylated and/or propoxylated polyethyleneimines (such as PEI600 E020 and/or PEI E024 P016), ethoxylated hexamethylene diamines, and sulfated versions thereof, alkoxylated polycarboxylates, including those derived from polyacrylates; amphiphilic graft copolymers, such as those derived from a polyethylene glycol backbone and having at least one pendant moiety selected from polyvinyl acetate, polyvinyl alcohol, or mixtures thereof (such as Sokalan HP22); cellulosic polymers, such as carboxymethyl cellulose, methyl cellulose, methyl hydroxyethyl cellulose, methyl carboxymethyl cellulose, and mixtures thereof, carboxylate polymers, such as a maleate/acrylate random copolymer or polyacrylate homopolymer; or mixtures thereof. Cellulosic polymers and/or carboxylate polymers may be particularly useful in dry or powdered treatment compositions, as they may be more difficult to formulate in liquid and gel forms.

It may be desirable to limit or even eliminate certain adjuncts, particularly if a detergent sourced primarily from natural or sustainable sources is desired. The detergent compositions of the present disclosure may be free of silicone, dye, brightener, or combinations thereof. The detergent compositions of the present disclosure may comprise less than 5%, or less than 3%, or less than 1%, by weight of the composition, of amine-containing compounds, with the proviso that amine oxide surfactant (if present) is not included in the total amount of amine-containing compounds.

The compositions of the present disclosure may be substantially free of selenium compounds. The compositions of the present disclosure may be substantially free of halopropargyl compounds.

Method of Making a Composition

The present disclosure relates to methods of making fabric care compositions comprising the oligoamines described herein. The method may include combining the components of the compositions described herein in the proportions described. For example, a oligoamine according to the present disclosure may be provided and combined with at least one additional treatment adjunct to form a treatment composition.

Liquid compositions according to the present disclosure may be made according to conventional methods, for example in a batch process or in a continuous loop process.

Solid compositions according to the present disclosure may be made according to conventional methods, for example by spray-drying process or in an agglomeration process.

The detergent compositions described herein may be encapsulated in a pouch, preferably a pouch made of water-soluble film, to form a unit dose article that may be used to treat fabrics. The pouch may include one compartment, or may have multiple compartments, which may be side-by-side and/or superposed. It may be preferred that such compositions have relatively low amounts of water, for example less than about 20%, or less than about 15%, or less than about 12%, or less than about 10%, or less than about 8%, by weight of the detergent composition, of water.

Method of Using Compositions

The present disclosure relates to methods of using the compositions described herein. The detergent compositions may be a fabric care composition and may be used to treat a surface, such as a fabric or other textile.

Methods of treating a surface may include the steps of: providing a surface, preferably a fabric, and contacting the surface with a composition according to the present disclosure, as described above. The method may include agitating the fabric in the presence of water. The method may further comprise the step of carrying out a washing or cleaning operation. Water may be added before, during, or after the contacting step to form a treatment liquor. The water and/or the treatment liquor may include copper ions ($Cu^{2+}$), for example at a level of from about 0.1 ppm to about 25 ppm.

The present disclosure also relates to a process for treating, for example by machine, a fabric, preferably soiled fabric, using a composition according to the present disclosure, comprising the steps of, placing a composition according to the present disclosure into contact with the fabric to be treated, and carrying out a treatment operation, such as a washing, cleaning, or fabric-enhancing operation. The contacting step may occur during the wash cycle or during the rinse cycle of an automatic washing machine.

Any suitable washing machine may be used, for example, a top-loading or front-loading automatic washing machine. Those skilled in the art will recognize suitable machines for the relevant treatment operation. The article of the present disclosure may be used in combination with other compositions, such as fabric additives, fabric softeners, rinse aids, and the like. Additionally, the detergent compositions of the present disclosure may be used in known hand washing methods.

The present disclosure may also be directed to a method of treating a fabric, the method comprising the steps of contacting a fabric with a detergent composition described herein, carrying out a washing step, and then contacting the fabric with a fabric softening composition. The entire method, or at least the washing step, may be carried out by hand, be machine-assisted, or occur in an automatic washing machine. The step of contacting the fabric with a fabric softening composition may occur in the presence of water, for example during a rinse cycle of an automatic washing machine.

Use of a Surfactant System

The present disclosure further relates to the use of a surfactant system, for example in a fabric care composition, to improve deposition and/or the malodor control properties of an oligoamine in relation to a target surface, such as a target fabric. The surfactant system comprises linear benzene sulfonate surfactant, as described in more detail above. The oligoamine is also described in more detail above. The surfactant system may further comprise AES, nonionic ethoxylated alcohol, AEC, or mixtures thereof, for example in any of the weight ratios with LAS as described in more detail above.

Combinations

Specifically contemplated combinations of the disclosure are herein described in the following lettered paragraphs. These combinations are intended to be illustrative in nature and are not intended to be limiting.

A. A treatment composition comprising an oligoamine and/or a salt thereof, and a surfactant system, wherein the oligoamine is present at a level of about 0.01% to 3.0%, by weight of the treatment composition, wherein the oligoamine has a structure according to according to Formula I.

Formula I

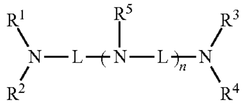

wherein each L is independently —$(C_mH_{m2})$—, wherein the index m is independently for each L an integer from 2 to 6, n is an integer from 1 to 10, and each of $R^1$-$R^5$ is independently selected from H and $C_1$-$C_4$ alkyl; and wherein the surfactant system comprises linear alkyl benzene sulfonate (LAS) surfactant.

B. A treatment composition according to paragraph A, wherein the oligoamine is present at a level of from about 0.01% to about 2%, or from about 0.02% to about 1%, or from about 0.03% to about 0.5%, or from about 0.05%, to about 0.2%, by weight of the treatment composition.

C. A treatment composition according to any of paragraphs A or B, wherein the index m is 2 or 3, preferably m is 2.

D. A treatment composition according to any of paragraphs A-C, wherein n is an integer from 1 to 5, preferably from 1 to 3, more preferably 1 or 2, even more preferably 1.

E. A treatment composition according to any of paragraphs A-D, wherein each of $R^1$-$R^5$ is independently selected from H and $C_1$ alkyl, preferably wherein at least one of $R^1$-$R^5$ is H, more preferably wherein at least one of $R^1$-$R^4$ is H, even more preferably wherein all are H.

F. A treatment composition according to any of paragraphs A-E, wherein the oligoamine is characterized by a molecular weight of from about 100 to about 1200 Da, or from about 100 to about 900 Da, or from about 100 to about 600 Da, or from about 100 to about 400 Da, or preferably between 100 Da and 250 Da, more preferably between 100 Da and 200 Da, even more preferably between 100 Da and 150 Da.

G. A treatment composition according to any of paragraphs A-F, wherein the treatment composition comprises from about 0.01% to about 5%, or to about 3%, or to about 2%, or to about 1%, or to about 0.75%, or to about 0.5%, or to about 0.4%, or to about 0.3%, or to about 0.2%, or to about 0.15%, by weight of the treatment composition, of the oligoamine.

H. A treatment composition according to any of paragraphs A-G, wherein the oligoamine is selected from the group consisting of: diethylenetriamine (DETA), 4-methyl diethylenetriamine (4-MeDETA), dipropylenetriamine (DPTA), 5-methyl dipropylenetriamine (5-MeDPTA), triethylenetetraamine (TETA), 4-methyl triethylenetetraamine (4-MeTETA), 4,7-dimethyl triethylenetetraamine (4,7-Me2TETA), 1,1,4,7,7-pentamethyl diethylenetriamine (M5-DETA), tripropylenetetraamine (TPTA), tetraethylenepentaamine (TEPA), tetrapropylenepentaamine (TPPA), pentaethylenehexaamine (PEHA), pentapropylenehexaamine (PPHA), hexaethyleneheptaamine (HEHA), hexapropyleneheptaamine (HPHA), N,N'-Bis(3-aminopropyl)ethylenediamine, and mixtures thereof.

I. A treatment composition according to any of paragraphs A-H, wherein the oligoamine is selected from the group consisting of diethylenetriamine (DETA), 4-methyl diethylenetriamine (4-MeDETA), 1,1,4,7,7-pentamethyl diethylenetriamine (M5-DETA), triethylenetetramine (TETA), tetraethylenepentaamine (TEPA), N,N'-Bis(3-aminopropyl) ethylenediamine, and mixtures thereof, even more preferably diethylenetriamine (DETA), 4-methyl diethylenetriamine (4-MeDETA), N,N'-Bis(3-aminopropyl)ethylenediamine, and mixtures thereof.

J. A treatment composition according to any of paragraphs A-I, wherein the oligoamine comprises diethylenetriamine (DETA).

K. A treatment composition according to any of paragraphs A-J, wherein the surfactant system comprises from about 5%, or from about 10%, or from about 20%, or from about 40%, or from about 50%, or from about 60%, or from about 70%, or from about 80%, or from about 90%, to about 100%, by weight of the surfactant system, of LAS surfactant.

L. A treatment composition according to any of paragraphs A-K, wherein the surfactant system further comprises a second surfactant, the second surfactant comprising alkyl ethoxylated sulfate (AES), nonionic ethoxylated alcohol, alkyl ethoxylated carboxylate (AEC), or mixtures thereof.

M. A treatment composition according to any of paragraphs A-L, wherein the second surfactant comprises AES, preferably wherein the weight ratio of LAS to AES is from about 10:90 to about 99:1, or from about 50:50 to about 99:1, or from about 50:50 to about 90:10, or from about 80:20 to about 90:10.

N. A treatment composition according to any of paragraphs A-M, wherein the second surfactant comprises nonionic ethoxylated alcohol surfactant, preferably wherein the weight ratio of LAS to nonionic ethoxylated alcohol surfactant is from about 10:90 to about 99:1, or from about 50:50 to about 99:1, or from about 50:50 to about 90:10, or from about 80:20 to about 90:10.

O. A treatment composition according to any of paragraphs A-N, wherein the second surfactant comprises alkyl ethoxylated carboxylate (AEC), preferably wherein the weight ratio of LAS to AEC is from greater than about 50:50 to 99:1, or from about 60:40 to about 95:5, or from about 75:25 to about 90:10.

P. A treatment composition according to any of paragraphs A-O, wherein the surfactant system is present at a level of from about 1% to about 90%, or from about 1% to about 80%, or from about 1% to about 70%, or from about 2% to about 60%, or from about 5% to about 50%, by weight of the treatment composition.

Q. A treatment composition according to any of paragraphs A-P, wherein the surfactant system further comprises a zwitterionic surfactant, preferably wherein the zwitterionic surfactant comprises amine oxide.

R. A treatment composition according to any of paragraphs A-Q, wherein the treatment composition comprises an additional treatment adjunct, preferably selected from antioxidant, hueing agent, optical brightener, additional chelating agents, enzymes, fatty acids and/or salts thereof, encapsulated benefit agents, soil release polymers, builders, dye transfer inhibiting agents, dispersants, enzyme stabilizers, catalytic materials, bleaching agents, bleach catalysts, bleach activators, polymeric dispersing agents, soil removal/anti-redeposition agents, polymeric grease cleaning agents, amphiphilic copolymers, suds suppressors, aesthetic dyes, perfume, structure elasticizing agents, fabric softeners, carriers, fillers, hydrotropes, solvents, anti-microbial agents and/or preservatives, pH adjusting agents, processing aids, fillers, rheology modifiers, structurants, opacifiers, pearlescent agents, pigments, anti-corrosion agents, anti-tarnishing agents, antifoams, chlorine scavengers, and mixtures thereof.

S. A treatment composition according to any of paragraphs A-R, wherein the additional treatment adjunct comprises an antioxidant, preferably an antioxidant comprising a hindered phenol.

T. A treatment composition according to any of paragraphs A-S, wherein the additional treatment adjunct comprises an additional chelating agent, preferably an additional chelating agent selected from phosphonates, aminocarboxylates, amino phosphonates, polyfunctionally-substituted aromatic chelating agents, or mixtures thereof, more preferably an additional chelating agent selected from DTPA (diethylenetriaminepentaacetic acid), HEDP (hydroxyethanediphosphonic acid), EDDS (ethylenediamine disuccinate (EDDS), DTPMP (diethylene triamine penta (methylene phosphonic acid)), EDTMP (ethylene diamine tetra(methylene phosphonic acid)), Tiron® (1,2-diydroxybenzene-3,5-disulfonic acid), HPNO (2-pyridinol-N-oxide), MGDA (methylglycinediacetic acid), GLDA (glutamic-N,N-diacetic acid), any suitable derivative thereof, salts thereof, and mixtures thereof.

U. A treatment composition according to any of paragraphs A-T, wherein the treatment composition is a fabric care composition, preferably a fabric care composition selected from light duty liquid detergents compositions, heavy duty liquid detergent compositions, laundry detergent gels, bleaching compositions, laundry additives, fabric enhancer compositions, and mixtures thereof, more preferably selected from heavy duty liquid detergent composition, a fabric enhancer composition, and mixtures thereof.

V. A treatment composition according to any of paragraphs A-U, wherein the treatment composition is in the form of a liquid composition, a granular composition, a single-compartment pouch, a multi-compartment pouch, a dissolvable sheet, a pastille or bead, a fibrous article, a tablet, a bar, a flake, a dryer sheet, or a mixture thereof.

W. A process of treating a surface, preferably wherein the surface is a fabric, the process comprising the steps of: (a) providing a surface, preferably a fabric, more preferably a fabric soiled with sebum, and (b) contacting the surface with a composition according to any of paragraphs A-V, optionally in the presence of water.

X. A use of a surfactant system in a fabric care composition to improve malodor control benefits of an oligoamine and/or a salt thereof with relation to a target fabric, the surfactant system comprising linear alkyl benzene sulphonate surfactant, and wherein the oligoamine has a structure according to according to Formula I:

Formula I

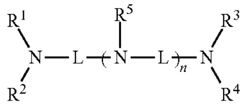

wherein each L is independently —($C_mH_{m2}$)—, wherein the index m is independently for each L an integer from 2 to 6, n is an integer from 1 to 10, and each of $R^1$-$R^5$ is independently selected from H and $C_1$-$C_4$ alkyl.

Y. A use according to paragraph X, wherein the surfactant system further comprises AES, nonionic ethoxylated alcohol surfactant, AEC, or a mixture thereof.

Test Methods

Malodor Reduction Test Method

The following method is used to test the malodor reduction benefits of a composition.

A. Preparation of 75 Grams Malodor Marker

Fatty acids and malodor markers are added into 100 ml glass gar with Teflon-lined cap according to Table A and mixed well using a vortex.

TABLE A

| Malodor marker composition | | | |
|---|---|---|---|
| Material | CAS # | % Composition | Weight needed (g) |
| Iso Valeric acid | 503-74-2 | 12.00 | 9.0 |
| Undecanal | 112-44-7 | 0.20 | 0.15 |
| Undecanoic Acid | 112-37-8 | 62.80 | 47.1 |
| Skatole | 83-34-1 | 1.00 | 0.75 |
| Decanoic Acid | 334-48-5 | 22.00 | 16.5 |
| Ethyl undecanoate | 627-90-7 | 2.00 | 1.5 |

B. Preparation of Body Soil Malodor Composition

Provided the specified amount of each material according to Table 2 into a 200 mL glass jar with Teflon lined cap. Artificial body soil (ABS) is commercially available by Accurate Product Development; 2028 Bohlke Blvd, Fairfield, OH 45014.

TABLE B

| Body soil malodor composition | |
|---|---|
| Material | Weight (g) |
| Malodor marker (from Table A) | 17.1 |
| Artificial Body Soil (ABS) | 15.8 |
| Di-propylene glycol monomethyl ether (CAS: 34590-94-8) | 105 |
| Squalene (cas # 111-02-4) | 15.8 |

C. Preparation of Malodor Test Fabrics

Sixteen malodor test fabrics per wash load are prepared by applying 300 μl of Body soil malodor composition described in Table B to de-sized 2×5 inch white polycotton 50/50 (PCW50/50) swatches. 48 grams of liquid detergent to be tested (see, e.g., Example 1, Table 1, below) is added to Duet 9200 washing appliance set to Normal cycle; 77° F. wash cycle followed by a 60° F. rinse cycle. Tap water is used, which contains an ambient level of copper, due to copper piping systems, for example. Malodor test fabrics are washed in 7 gpg wash water with 3.9 kg, 50×50 cm clean cotton and poly-cotton ballast then dried in a Maytag double stack tumble drier set to low for 20 minutes. The dried fabrics are placed in a mylar bag and sealed for 24 hours.

D. Analytical Detection of Malodor on Fabric

The malodor reduction using ABS/Squalene malodor sensors are quantitatively determined by Gas Chromatography Mass Spectroscopy using an Agilent gas chromatograph 7890B equipped with a mass selective detector (5977B), a Chemstation quantitation package and a Gerstel multi-purpose sampler equipped with a solid phase micro-extraction (SPME) probe. Calibration standards of 6-Methyl-5-hepten-2-one (CAS 110-93-0), Trans-2-heptenal (18829-55-5) and 3-methyl-2-Butenal (107-86-8) are prepared by dissolving a known weight of these materials in light mineral oil (CAS 8020-83-5) (each material available from Sigma Aldrich). Fabrics are cut into uniform 2 inch by 2.5 inch pieces and placed in 10 mL headspace crimp vials. Vials are equilibrated greater than 12 hours before analysis. The following settings are used in the auto sampler: 80 C incubation temperature, 90 min incubation time, VT32-10 sample tray type, 22 mm vial penetration, 20 min extraction time, 54 mm injection penetration and 300 s desorption time. The following settings are used for the Front Split/Splitless inlet helium: split mode, 250 C temperature, 12 psi pressure, 79.5 mL/min total flow, 3 mL/min septum purge flow, 50:1 split ratio and 22.5 min GC run time. The follow settings are used in the oven: 40 C initial temperature, 12 C/min heating program, 250 C temperature and 5 min hold time. Based on the partition coefficients (K at 80 C) of each component, the total nMol/L liter of 6-Methyl-5-hepten-2-one (K=3353), Trans-2-heptenal (K=3434), and 3-methyl-2-Butenal (K=1119) are calculated.

These values of these three measurements (in nmoles/L) are added together to provide the Total ABS/Squalene Markers (nmoles/L) for a given test leg.

E. Malodor Reduction Oxidation Products Calculations

The % Malodor Reduction Oxidation Products is provided as a percentage comparing the reduction of the amount of selected malodor markers as provided by the test composition compared to the (nil-oligoamine) reference composition. The value is determined as follows:

$$\%\ \text{Reduction Oxidation Products}=(\text{Markers}_{ref}-\text{Markers}_{test})\times 100/\text{Markers}_{ref}$$

Values for $\text{Markers}_{ref}$ and $\text{Markers}_{test}$ are defined as follows:

$\text{Markers}_{ref}$=Total ABS/Squalene Markers (nmoles/L) of the fabrics washed with the formulation without oligoamine (e.g., the reference or control formulation)

$\text{Markers}_{test}$=Total ABS/Squalene Markers (nmoles/L) of the fabrics washed with the formulation with the tested oligoamine As the measured oxidation products are typically considered malodorous, it is believed that the greater the % reduction of oxidation products provided by a composition, the less malodorous the treated fabrics are likely to be. Therefore, greater values of % Malodor Reduction Oxidation Products are typically preferred. The compositions and processes of the present disclosure may provide a % Malodor Reduction Oxidation Products value of at least about 10%, or at least about 20%, or at least about 30%, or at least about 40%, or at least about 50%, or at least about 60%, or at least about 70%, or at least about 80%.

Malodor reduction may also be reported as the difference between $\text{Markers}_{ref}$ and $\text{Markers}_{test}$, thereby showing an absolute difference (e.g., Delta ABS/Squalene Oxidation).

Whiteness Loss Test Method Test

The following procedures are followed to test for whiteness losses (e.g., ΔWI).

A. Preparation of Whiteness Test Fabrics

De-sized Cotton, Polycotton and Polyester whiteness test fabrics can be ordered from WFK. (WFK Testgewebe GmbH, Christenfeld 10, D-41379 Bruggen, Germany). Four of each fabric type (12 fabrics total) are prepared for the whiteness test by washing them four times in 48 grams (750 ppm) of Tide Free and Clear and 25 grams (390 ppm) Downy Free rinse in a Kenmore Top Loader set to Normal wash cycle, 77 F wash, 60 F rinse, 7 grains per gallon. An initial whiteness reference measurement is made using Konica Minolta spectrophotometer and reported as Initial Whiteness Index CIE. The Whiteness Index CIE value is a common index of whiteness and refers to measurements made under D65 illumination, the standard representation of outdoor daylight. For a perfect reflecting, non-fluorescent white material, the CIE Whiteness would be 100. In technical terms, whiteness is a single number index referencing the relative degree of whiteness of near-white materials under specific lighting conditions. The index has been devised such that most people will agree that the higher the whiteness index, the whiter the material.

B. Whiteness Test

Fabrics are placed in a 7.57 liter custom washing tub under the conditions summarized in Table 3 below. Fabrics are washed with 5.65 grams (746 ppm) of detergent (liquid TIDE®) in the wash cycle together with background soil, followed by 3 grams (396 ppm) liquid fabric softener (DOWNY® Free) in the rinse cycle. Once the rinse cycle is complete, all the fabrics are removed and placed in a tumble dryer. This is repeated for 10 wash, rinse and dry cycles. After 10 cycles, fabrics are measured for whiteness loss using a Konica Minolta spectrophotomer and the measurement is reported as Final Whiteness Index. An average delta WI (i.e., ΔWI), representing the difference in the whiteness index measurements between the initial and treated, is calculated for each fabric tested, and represented by the following calculation: ΔWI=Initial Whiteness Index after preparation−Treated Whiteness Index after 10-20 cycles. Typically, ΔWI is a negative value as the whiteness tends to decrease after washing with background soil. The whiteness index is reported in the table as ΔΔWI=ΔWI test with oligoamine−ΔWI REF (nil oligoamine). ΔΔW is a negative value if the whiteness tends to decrease after washing with a test liquid detergent composition containing a oligoamine compared to a reference liquid detergent composition that does not contain an oligoamine. Numbers close to zero would represent an oligoamine which has little impact on fabric yellowing.

TABLE C

| Wash, Rinse and Drying Conditions | Setting |
|---|---|
| Agitation (strokes per min) | 80spm (Normal) |
| Wash Temperature | 60 F. |
| Water Hardness | 7gpg |
| Rinse Temperature | 60 F. |
| Wash Cycle Time | 45 second liquid pre-dissolve, 18 min cycle |
| Rinse Cycle Time | 2 min cycle |
| Tub Volume | 7.57 liters |
| Drying Time | 35-40 min High heat setting (or until dry) |
| Background Soil | 1 Artificial Body Soil Terry Artificial body soil terry is commercially available by Accurate Product Development; 2028 Bohlke Blvd, Fairfield, OH 45014. 1 SBL2004 sheets from WFK Testgewebe GmbH Optionally, dingy fabrics as supplied by consumers |
| Internal fabric replicates | 4 Cotton (CW 120), 4 Polycotton (PC 50/50), 4 Polyester (PW 19) |

EXAMPLES

The examples provided below are intended to be illustrative in nature and are not intended to be limiting.

Example 1. Exemplary Formulations (Heavy Duty Liquid Laundry Detergents)

The following heavy duty liquid laundry detergent compositions may be prepared by traditional means known to those of ordinary skill in the art by mixing the listed ingredients Table 1. Composition 1A is a conventional premium laundry detergent that contains no linear oligoamines of the present disclosure. Composition 1B is a comparative example that includes EDDS chelant. All of the provided compositions include linear alkyl benzene sulphonate surfactant.

TABLE 1

| Raw Material | 1A Active Wt % (comp) | 1B Active Wt % (comp) | 1C Active Wt % | 1D Active Wt % | 1E Active Wt % |
|---|---|---|---|---|---|
| C12-15 alkyl ethoxy (1.8) sulfate | 11.7 | 11.7 | 11.7 | 11.7 | 11.7 |
| Alkyl benzene sulfonate[1] | 7.2 | 7.2 | 7.2 | 7.2 | 7.2 |
| C12-14 Amine Oxide | 0.7 | 0.7 | 0.7 | 0.7 | 0.7 |
| C12-14 EO9 [2] | 5 | 5 | 5 | 5 | 5 |
| Citric Acid | 2.1 | 2.1 | 2.1 | 2.1 | 2.1 |
| C12-18 Fatty Acid | 0.9 | 0.9 | 0.9 | 0.9 | 0.9 |
| Sodium hydroxide | 0.2 | 0.2 | 0.2 | 0.2 | 0.2 |
| Chelant[3] | 0.47 | 0.47 | 0.47 | 0.47 | 0.47 |
| Ethylenediaminedisuccinic acid (EDDS chelant) | — | 0.5 | — | — | — |
| Oligoamine 1[9] | — | — | 0.1 | — | — |
| Oligoamine 2[10] | — | — | — | 0.1 | — |
| Oligoamine 3[11] | — | — | — | — | 0.1 |
| Monoethanolamine (MEA) | 2.9 | 2.9 | 2.9 | 2.9 | 2.9 |
| Diethylene glycol (DEG) | 2.4 | 2.4 | 2.4 | 2.4 | 2.4 |
| 1,2-Propanediol | 2.1 | 2.1 | 2.1 | 2.1 | 2.1 |
| Borate | 1 | 1 | 1 | 1 | 1 |
| Ethanol | 1.5 | 1.5 | 1.5 | 1.5 | 1.5 |
| Sorbitol | 0.06 | 0.06 | 0.06 | 0.06 | 0.06 |
| Sodium Cumene Sulfonate | 0.15 | 0.15 | 0.15 | 0.15 | 0.15 |
| Ethoxylated Polyethyleneimine [4] | 1.5 | 1.5 | 1.5 | 1.5 | 1.5 |
| Amphiphilic alkoxylated grease cleaning polymer[5] | 1.3 | 1.3 | 1.3 | 1.3 | 1.3 |
| Calcium formate | 0.1 | 0.1 | 0.1 | 0.1 | 0.1 |
| Sodium Chloride | 0.03 | 0.03 | 0.03 | 0.03 | 0.03 |
| Protease[6] | 0.068 | 0.068 | 0.068 | 0.068 | 0.068 |
| Mannanase[7] | 0.002 | 0.002 | 0.002 | 0.002 | 0.002 |
| Amalyse[7] | 0.007 | 0.007 | 0.007 | 0.007 | 0.007 |
| Fluorescent Whitening Agents[8] | 0.3 | 0.3 | 0.3 | 0.3 | 0.3 |
| V200 Whiteness Dye | 0.025 | 0.025 | 0.025 | 0.025 | 0.025 |
| Perfume | 0.6 | 0.6 | 0.6 | 0.6 | 0.6 |
| Hydrogenated Castor Oil | 0.1 | 0.1 | 0.1 | 0.1 | 0.1 |
| Phenoxyethanol | 0.001 | 0.001 | 0.001 | 0.001 | 0.001 |
| Benzisothiazolinone | 0.001 | 0.001 | 0.001 | 0.001 | 0.001 |
| Aesthetic dye | 0.01 | 0.01 | 0.01 | 0.01 | 0.01 |
| DC1520 Silicone Suds suppressor | 0.003 | 0.003 | 0.003 | 0.003 | 0.003 |
| AF8017 Silicone Suds suppressor | 0.2 | 0.2 | 0.2 | 0.2 | 0.2 |
| Water/Misc. | Balance | Balance | Balance | Balance | Balance |

[1]Linear alkylbenzenesulfonate having an average aliphatic carbon chain length C11-C12 supplied by Stepan, Northfield, Illinois, USA

[2]AE9 is C12-14 alcohol ethoxylate, with an average degree of ethoxylation of 9, supplied by Huntsman, Salt Lake City, Utah, USA

[3]Diethylenetetraamine pentaacetic acid (DTPA) supplied by Dow Chemical, Midland, Michigan, USA;

Hydroxyethane di phosphonate (HEDP) supplied by Solutia, St Louis, Missouri, USA Bagsvaerd, Denmark, may also be used.

[4]Polyethyleneimine (MW = 600) with 20 ethoxylate groups per —NH.

[5]Amphiphilic alkoxylated grease cleaning polymer is a polyethyleneimine (MW = 600) with 24 ethoxylate groups per –NH and 16 propoxylate groups per —NH.

[6]Proteases may be supplied by Genencor International, Palo Alto, California, USA (e.g. Purafect Prime ®) or by Novozymes, Bagsvaerd, Denmark (e.g. Liquanase ®, Coronase ®).

[7]Natalase ®, Mannaway ® are all products of Novozymes, Bagsvaerd, Denmark.

[8]Suitable Fluorescent Whitening Agents are for example, Tinopal ® AMS, Tinopal ® CBS-X

[9]Diethylenetriamine (DETA)

[10]N,N'-Bis (3-aminopropyl)ethylenediamine

[11]Tetraethylenepentamine (TEPA)

Example 2. Malodor Control of Linear Oligoamines Vs. Known Chelant

To show the malodor control effects of linear oligoamines of the present disclosure, various liquid detergent compositions are prepared according to Example 1, Table 1, above. Each composition contains linear alkylbenzene sulphonate (LAS). Some have one or more conventional chelating agents; some include linear oligoamines according to the present disclosure.

Example 2A is a premium-type laundry detergent that contains conventional chelant (diethylenetetraamine pentaacetic acid (DTPA)). Additional amines are added for Examples 2B, 2C, 2D, and 2E. Examples 2B is contains an additional amino chelating agent, ethylenediaminedisuccinic acid (EDDS). Examples 2C, 2D and 2E contain linear oligoamines of the present disclosure, as detailed below in Table 2. The compositions are tested for % Reduction Oxidation Products according to the test method provided above. Results are shown in Table 2.

TABLE 2

| Example | Liquid Composition | Additional amine | Mole Ratio Anionic Surfactant to Protonatable Amine | % Reduction Oxidation Products vs. REF |
|---|---|---|---|---|
| 2A (REF) | 1A | None | — | (REF) |
| 2B | 1B | EDDS | — | 6 |
| 2C | 1C | DETA | 26 | >70 |
| 2D | 1D | N,N'-Bis (3-aminopropyl) ethylenediamine[1] | 29 | >70 |
| 2E | 1E | TEPA | 24 | >70 |

[1]N,N'-Bis (3-aminopropyl) ethylenediamine has the following structure:

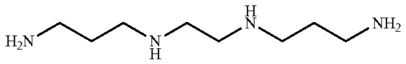 [SMILES: NCCCNCCNCCCN]

The results in Table 2 show the malodor control benefits of linear oligoamines of Examples 2C, 2D, and 2E compared to the nil-additional-amine composition of 2A. Examples 2C, 2D, and 2E also show improved malodor control compared to Example 2B, indicating that the oligoamines perform better than EDDS, a different amine-containing chelant.

Example 3. Malodor Control of Linear Oligoamine in Combination with LAS, and Optionally AES To show the benefits of linear oligoamines of the present disclosure in combination with LAS, and optionally with AES, liquid detergent compositions having the ingredients as shown below in Table 3A are prepared. Leg A is free of a linear oligoamine according to the present disclosure; Leg B includes diethylenetriamine (DETA), a representative linear oligoamine, at a level of 0.2 wt %. Furthermore, the compositions of each leg include a surfactant system at a level of 18.1%. However, the surfactant systems include LAS and AES at various ratios, as shown in Table 3B.

To test for the malodor control benefits of DETA in the various surfactant systems, fabrics are treated (North American top loader machine, water: 87° F./7 gpg) and tested for malodor removal as described above. Results of the malodor removal test is shown in Table 3B.

TABLE 3A

| Ingredient | Leg A Active Wt % | Leg B Active Wt % |
|---|---|---|
| Surfactant System (varied ratios) | 18.1 | 18.1 |
| Citric Acid | 2.0 | 2.0 |
| C12-18 Fatty Acid | 0.9 | 0.9 |
| Sodium hydroxide | 0.2 | 0.2 |
| Chelant[3] | 0.45 | 0.45 |
| Oligoamine[10] | 0 | 0.2 |
| Monoethanolamine (MEA) | 1.9 | 1.9 |
| Diethylene glycol (DEG) | 2.7 | 2.7 |
| 1,2-Propanediol | 2.8 | 2.8 |
| Borate | 1.0 | 1.0 |
| Ethanol | 4.9 | 4.9 |
| Sorbitol | 0.08 | 0.08 |
| Sodium Cumene Sulfonate | 0.15 | 0.15 |
| Ethoxylated Polyethyleneimine [4] | 1.5 | 1.5 |
| Amphiphilic alkoxylated grease cleaning polymer[5] | 1.3 | 1.3 |
| Calcium formate | 0.1 | 0.1 |
| Sodium Chloride | 0.02 | 0.02 |
| Protease[6] | 0.064 | 0.064 |
| Mannanase[7] | 0.001 | 0.001 |

TABLE 3A-continued

| Ingredient | Leg A Active Wt % | Leg B Active Wt % |
|---|---|---|
| Amalyse[7] | 0.009 | 0.009 |
| Fluorescent Whitening Agents[8] | 0.2 | 0.2 |
| Phenoxyethanol | 0.002 | 0.002 |
| Benzisothiazolinone | 0.001 | 0.001 |
| DC1520 Silicone Suds suppressor | 0.003 | 0.003 |
| Water/Misc. | Balance | Balance |

[3]Diethylenetetraamine pentaacetic acid (DTPA) supplied by Dow Chemical, Midland, Michigan, USA;
Hydroxyethane diphosphonate (HEDP) supplied by Solutia, St Louis, Missouri, USA Bagsvaerd, Denmark, may also be used.
[4]Polyethyleneimine (MW = 600) with 20 ethoxylate groups per —NH.
[5]Amphiphilic alkoxylated grease cleaning polymer is a polyethyleneimine (MW = 600) with 24 ethoxylate groups per —NH and 16 propoxylate groups per —NH.
[6]Proteases may be supplied by Genencor International, Palo Alto, California, USA (e.g. Purafect Prime ®) or by Novozymes, Bagsvaerd, Denmark (e.g. Liquanase ®, Coronase ®).
[7]Natalase ®, Mannaway ® are all products of Novozymes, Bagsvaerd, Denmark.
[8]Suitable Fluorescent Whitening Agents are for example, Tinopal ® AMS, Tinopal ® CBS-X
[9]Octadecyl 3-(3,5-di-tert-butyl-4-hydroxyphenyl)propionate, sold commercially as Tinogard TS (BASF)
[10]Oligoamine of the present disclosure is Diethylenetriamine (DETA)

TABLE 3B

| Example | LAS[1]:AES[2] Wt. Ratio | Leg A: Mean ABS/Squalene Oxidation (nil DETA) | Leg B: Mean ABS/Squalene Oxidation (with 0.2% DETA) | Delta ABS/Squalene Oxidation (Leg A − Leg B) |
|---|---|---|---|---|
| 3A | 100:0 | 172 | 3.1 | 169 |
| 3B | 90:10 | 164 | 8.6 | 155 |
| 3C | 80:20 | 146 | 24 | 122 |
| 3D | 40:60 | 141 | 87 | 54 |
| 3E | 20:80 | 130 | 53 | 77 |
| 3F | 10:90 | 130 | 56 | 74 |
| 3G (comp) | 0:100 | 117 | 86 | 31 |

[1]Linear alkylbenzenesulfonate having an average aliphatic carbon chain length C11-C12 supplied by Stepan, Northfield, Illinois, USA
[2]C12-15 alkyl ethoxy (1.8) sulfate As shown in Table 3B, compositions that include a combination of LAS and DETA provide improved malodor reduction benefits compared to DETA in a nil-LAS surfactant system (e.g., Example 3G). Furthermore, the benefit becomes more pronounced as the relative amount of LAS in the surfactant system increases (e.g., greater than 40:60 LAS:AES wt ratio). This is particularly surprising, given that the amount of malodorous oxidation products generally increases as the relative amount of LAS increases in the nil-DETA leg (Leg A).

Example 4. Malodor Control of Linear Oligoamine in Combination with LAS, and Optionally with Nonionic Ethoxylated Alcohol Surfactant To show the benefits of linear oligoamines of the present disclosure in combination with LAS, and optionally with nonionic ethoxylated alcohol surfactant, liquid detergent compositions having the general ingredients as shown above in Example 3, Table 3A are prepared. Leg A is free of a linear oligoamine according to the present disclosure; Leg B includes diethylenetriamine (DETA), a representative linear oligoamine, at a level of 0.2 wt %. Furthermore, the compositions of each leg include a surfactant system at a level of 18.1%. However, for the purposes of Example 4, the surfactant systems include LAS and nonionic ethoxylated alcohol surfactant at various ratios, as shown in Table 4.

To test for the malodor control benefits of DETA in the various surfactant systems, fabrics are treated (North American top loader, water: 87° F./7 gpg) and tested for malodor reduction as described above. Results of the malodor reduction test is shown in Table 4.

TABLE 4

| Example | LAS[1]:NI[2] Wt. Ratio | Leg A: Mean ABS/Squalene Oxidation (nil DETA) | Leg B: Mean ABS/Squalene Oxidation (with 0.2% DETA) | Delta ABS/Squalene Oxidation (Leg A − Leg B) |
|---|---|---|---|---|
| 4A | 100:0 | 175 | 1.3 | 174 |
| 4B | 90:10 | 182 | 41 | 141 |
| 4C | 80:20 | 171 | 43 | 128 |
| 4D | 40:60 | 163 | 61 | 102 |
| 4E | 20:80 | 142 | 104 | 38 |
| 4F | 10:90 | 133 | 82 | 51 |
| 4G (comp) | 0:100 | 108 | 79 | 29 |

[1]Linear alkylbenzenesulfonate having an average aliphatic carbon chain length C11-C12 supplied by Stepan, Northfield, Illinois, USA
[2]Nonionic ethoxylated alcohol surfactant, specifically C12-14 alcohol ethoxylate, with an average degree of ethoxylation of 9, supplied by Huntsman, Salt Lake City, Utah, USA As shown in Table 4, compositions that include a combination of LAS and DETA provide improved malodor reduction benefits compared to DETA in a nil-LAS surfactant system (e.g., Example 4G). Furthermore, the malodor reduction benefit becomes more pronounced as the relative amount of LAS in the surfactant system increases (e.g., at 40:60 LAS:NI wt ratio or greater).

Example 5. Malodor Control of Linear Oligoamine in Combination with LAS and Alkyl Ethoxylated Carboxylates (AEC) Surfactant To show the benefits of linear oligoamines of the present disclosure in combination with LAS and AEC surfactants, liquid detergent compositions having the general ingredients as shown above in Example 3, Table 3A are prepared. Leg A is free of a linear oligoamine according to the present disclosure; Leg B includes diethylenetriamine (DETA), a representative linear oligoamine, at a level of 0.2 wt %. Furthermore, the compositions of each leg include a surfactant system at a level of 18.1%. However, for the purposes of Example 5, the surfactant systems include LAS and alkyl ethoxylated carboxylate (AEC) surfactant at various ratios, as shown in Table 5.

Fabrics are treated in a North American top-loading automatic washing machine (water: 30.6° C., 7 gpg). The malodor reduction benefits are provided in Table 5 as the percentage reduction of oxidation products on textiles treated in the second leg (Leg B, with DETA) compared to the first leg (Leg A, nil-DETA).

TABLE 5

| Example | LAS[1]:AEC[2] Wt. Ratio | % Reduction Oxidation Products (0.2% DETA vs. nil-DETA) |
|---|---|---|
| 5A | 0:100 | 46% |
| 5B | 25:5 | 35% |
| 5C | 50:0 | 42% |
| 5D | 75:25 | 71% |

[1]Linear alkylbenzenesulfonate having an average aliphatic carbon chain length C11-C12 supplied by Stepan, Northfield, Illinois, USA
[2]C12-C14-alcohol polyethylene glycol ether carboxylic acid (Marlowet 4541 supplied by Sasol)

As shown in Table 5, example 5D, which contains the greatest relative amount of LAS, provides the greatest malodor reduction benefits.

Example 6. Effects of Alkylation

To show the effects that various degrees of alkylation of the presently described oligamines can have on malodor reduction benefits, the following molecules are tested at the provided levels according to the test method provided above. The oligamines are added to a liquid detergent that includes LAS, AES, and nonionic surfactants. The tests are run in a North American front-loading automatic washing machine.

The percentage reduction of oxidation products vs. the reference composition are provided for each compound below in Tables 6A and 6B.

TABLE 6A

| Example | Oligoamine (0.2 wt %) | Structure | % Reduction Oxidation Products vs. REF |
|---|---|---|---|
| 6A (REF) | Nil-Oligoamine (0%) | — | REF |
| 6B | 0.2% DETA | 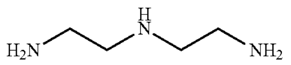 | 94 |
| 6C | 0.2% M3s-DETA | 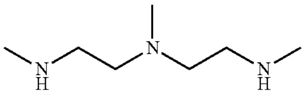 | 54 |
| 6D | 0.2% M5s-DETA | 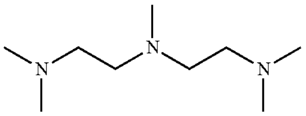 | 31 |

As shown by the structures above, Example 6B features terminal primary amines, Example 6C features terminal secondary amines, and Example 6D features terminal tertiary amines. As shown in Table 6A, Examples 6B3-6D) each provide malodor reduction benefits, with Example 6B providing the relatively greatest malodor reduction.

TABLE 6B

| Example | Oligoamine (0.1 wt %) | Structure | % Reduction Oxidation Products vs. REF |
|---|---|---|---|
| 6E (REF) | Nil-Oligoamine (0%) | — | REF |
| 6F | 0.1% DETA | 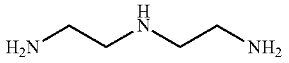 | 91 |
| 6G | 0.1% M1s-DETA | 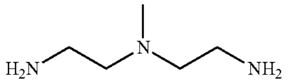 | 85 |
| 6H | 0.1% M3s-DETA | 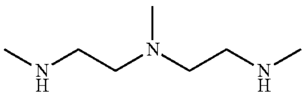 | 26 |
| 6I | 0.1% M5s-DETA | 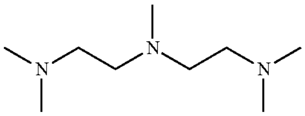 | 0 |

As shown in Table 6B3, Example 6F provides the relatively greatest malodor reduction.

Example 7. Oligoamine vs. Whiteness

To show the effect that oligoamines (and 00 levels thereof) can have on whiteness, certain amines are added to North American liquid TIDE® (a commercially available heavy duty liquid laundry detergent) as provided in Table 7. The detergent composition includes LAS, AES, and nonionic surfactant. Various fabrics (cotton, polycotton, and polyester) are treated under North American conditions for ten wash cycles with the compositions.

After ten cycles, whiteness losses are determined according to the ΔWI test, as provided above in the Test Methods section. Results are provided in Table 7. Negative numbers show whiteness losses, with numbers of greater magnitude indicating greater whiteness losses (e.g., −10 indicates more whiteness loss than −5). It is preferred that the whiteness losses are between 0 and −5, or between 0 and −4. Whiteness losses that are greater in magnitude indicate that the product may be less preferred for consumer use.

TABLE 7

| Trial | Amine (wt %) | Cotton ΔWI vs Tide ® | Polycotton ΔWI vs Tide ® | Polyester ΔWI vs Tide ® |
|---|---|---|---|---|
| 7A (TIDE ®REF) | — | 0.0 | 0.0 | 0.0 |
| 7B | 0.094% DETA | −4.5 | −4.7 | −3.9 |
| 7C | 0.04% N4 Amine | −3.0 | −5.7 | −3.7 |
| 7D | 1.2% DETA | −16.5 | −19.5 | −19.2 |

As shown in Table 7, the presence of amines may result in whiteness losses upon multiple treatments. However, the whiteness losses provided by amine levels of, e.g., less than 0.1 wt % (see Trials 7B and 7C) are relatively acceptable to a manufacturer. By way of comparison, Trial 7D, which includes DETA levels of above 1%, shows whiteness losses that are believed to be less preferred. It is believed that alkylated oligoamines may further improve whiteness losses and/or allowing the oligoamines to be formulated at relatively higher levels while keeping whiteness losses within an acceptable range.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A treatment composition comprising an oligoamine, and a surfactant system, wherein the oligoamine is diethylenetriamine (DETA) and is present at a level of about 0.01% to about 0.5%, by weight of the treatment composition, wherein the surfactant system is present at a level of from about 5% to about 50%, by weight of the composition, wherein the surfactant system comprises linear alkyl benzene sulfonate (LAS) surfactant and alkyl ethoxylated carboxylate (AEC) surfactant, wherein the weight ratio of LAS to AEC is from greater than about 75:25 to about 90:10, wherein the alkyl group of the LAS comprises an average by weight of 11 to 13 carbon atoms, wherein the surfactant system comprises from about 20% to about 90%, by weight of the surfactant system, of the LAS surfactant, and wherein the treatment composition is a fabric care composition.

2. A treatment composition according to claim 1, wherein the surfactant system further comprises alkyl ethoxylated sulfate (AES), nonionic ethoxylated alcohol, or mixtures thereof.

3. A treatment composition according to claim 2, wherein the surfactant system comprises AES, wherein the weight ratio of LAS to AES is from about 10:90 to about 99:1.

4. A treatment composition according to claim 2, wherein the surfactant system comprises nonionic ethoxylated alcohol surfactant, wherein the weight ratio of LAS to nonionic ethoxylated alcohol surfactant is from about 10:90 to about 99:1.

5. A treatment composition according to claim 1, wherein the surfactant system further comprises a zwitterionic surfactant, wherein the zwitterionic surfactant comprises amine oxide.

6. A treatment composition according to claim 1, wherein the treatment composition comprises an additional treatment adjunct selected from the group consisting of antioxidant, hueing agent, optical brightener, additional chelating agents, enzymes, fatty acids and/or salts thereof, encapsulated benefit agents, soil release polymers, builders, dye transfer inhibiting agents, dispersants, enzyme stabilizers, catalytic materials, bleaching agents, bleach catalysts, bleach activators, polymeric dispersing agents, soil removal/anti-redeposition agents, polymeric grease cleaning agents, amphiphilic copolymers, suds suppressors, aesthetic dyes, perfume, structure elasticizing agents, fabric softeners, carriers, fillers, hydrotropes, solvents, anti-microbial agents and/or preservatives, pH adjusting agents, processing aids, fillers, rheology modifiers, structurants, opacifiers, pearlescent agents, pigments, anti-corrosion agents, anti-tarnishing agents, antifoams, chlorine scavengers, and mixtures thereof.

7. A treatment composition according to claim 6, wherein the additional treatment adjunct comprises an antioxidant.

8. A treatment composition according to claim 6, wherein the additional treatment adjunct comprises an additional chelating agent.

9. A process of treating a surface, the process comprising the steps of:

a. providing a surface, and b. contacting the surface with a composition according to claim 1, optionally in the presence of water.

* * * * *